(12) United States Patent
Kim et al.

(10) Patent No.: US 10,731,815 B2
(45) Date of Patent: Aug. 4, 2020

(54) LAMP FOR VEHICLE AND VEHICLE

(71) Applicant: ZKW Group GmbH, Wieselburg (AT)

(72) Inventors: Youngil Kim, Seoul (KR); Yongjae Kim, Seoul (KR); Myungjae Song, Seoul (KR)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 16/245,694

(22) Filed: Jan. 11, 2019

(65) Prior Publication Data

US 2019/0219240 A1 Jul. 18, 2019

(30) Foreign Application Priority Data

Jan. 12, 2018 (KR) .................. 10-2018-0004682

(51) Int. Cl.
| | |
|---|---|
| *F21S 41/24* | (2018.01) |
| *F21S 43/243* | (2018.01) |
| *F21S 43/249* | (2018.01) |
| *F21S 43/239* | (2018.01) |
| *B60Q 1/38* | (2006.01) |

(Continued)

(52) U.S. Cl.
CPC .............. *F21S 41/24* (2018.01); *B60Q 1/38* (2013.01); *F21S 41/28* (2018.01); *F21S 41/30* (2018.01); *F21S 43/239* (2018.01); *F21S 43/243* (2018.01); *F21S 43/249* (2018.01); *G02B 6/0001* (2013.01)

(58) Field of Classification Search
CPC . F21S 41/24; F21S 41/28; F21S 41/30; G02B 6/002; G02B 6/42; G02B 6/0013; G02B 6/0001
See application file for complete search history.

(56) References Cited

U.S. PATENT DOCUMENTS 6,305,813 B1 * 10/2001 Lekson .................. B60Q 1/302
362/625
6,835,440 B1 * 12/2004 Konishi .................. B29C 45/00
264/1.24

(Continued)

FOREIGN PATENT DOCUMENTS

| DE | 102011055431 | 5/2013 |
|---|---|---|
| EP | 02927572 | 10/2015 |

(Continued)

OTHER PUBLICATIONS

Extended European Search Report in European Application No. 19151148.4, dated May 16, 2019, 8 pages.

*Primary Examiner* — Jong-Suk (James) Lee
*Assistant Examiner* — Christopher E Dunay
(74) *Attorney, Agent, or Firm* — Fish & Richardson P.C.

(57) ABSTRACT

A lamp for a vehicle includes a cover lens, a housing that is coupled to the cover lens and that defines a lamp space with the cover lens, a light output unit including a plurality of light generation groups that are arranged inside of the lamp space in a first direction, and a light guide that has a three-dimensional (3D) shape and that is configured to guide light from the light output unit in a light output direction. The light guide includes: a first surface that defines a portion of the 3D shape of the light guide and that faces the light output unit, and a second surface that defines a portion of the 3D shape of the light guide and that defines an acute angle with respect to the first surface.

21 Claims, 24 Drawing Sheets

(51) Int. Cl.
  *F21S 41/30* (2018.01)
  *F21S 41/20* (2018.01)
  *F21V 8/00* (2006.01)

(56) References Cited

U.S. PATENT DOCUMENTS

| | | | | |
|---|---|---|---|---|
| 7,664,350 | B2 * | 2/2010 | Ghosh | F24S 23/30 |
| | | | | 385/31 |
| 2003/0235046 | A1 * | 12/2003 | Chinniah | F21S 41/24 |
| | | | | 362/602 |
| 2006/0104092 | A1 * | 5/2006 | Feng | G02B 6/0016 |
| | | | | 362/626 |
| 2006/0193144 | A1 * | 8/2006 | Braeutigam | B60Q 1/2665 |
| | | | | 362/493 |
| 2008/0231772 | A1 * | 9/2008 | Hung | F21V 5/04 |
| | | | | 349/65 |
| 2012/0081915 | A1 * | 4/2012 | Foote | B60R 1/12 |
| | | | | 362/494 |
| 2014/0003071 | A1 * | 1/2014 | de Lamberterie | F21S 41/141 |
| | | | | 362/487 |
| 2015/0009693 | A1 * | 1/2015 | Sekiguchi | B60Q 1/08 |
| | | | | 362/465 |
| 2017/0205043 | A1 | 7/2017 | Tokieda et al. | |
| 2018/0245763 | A1 * | 8/2018 | Oshima | B60Q 1/2607 |
| 2019/0212560 | A1 * | 7/2019 | Sugiyama | B60K 35/00 |

FOREIGN PATENT DOCUMENTS

| | | |
|---|---|---|
| JP | 2015528634 | 9/2015 |
| KR | 1020040049963 | 6/2004 |
| WO | WO2017033820 | 3/2017 |

\* cited by examiner

FIG. 1
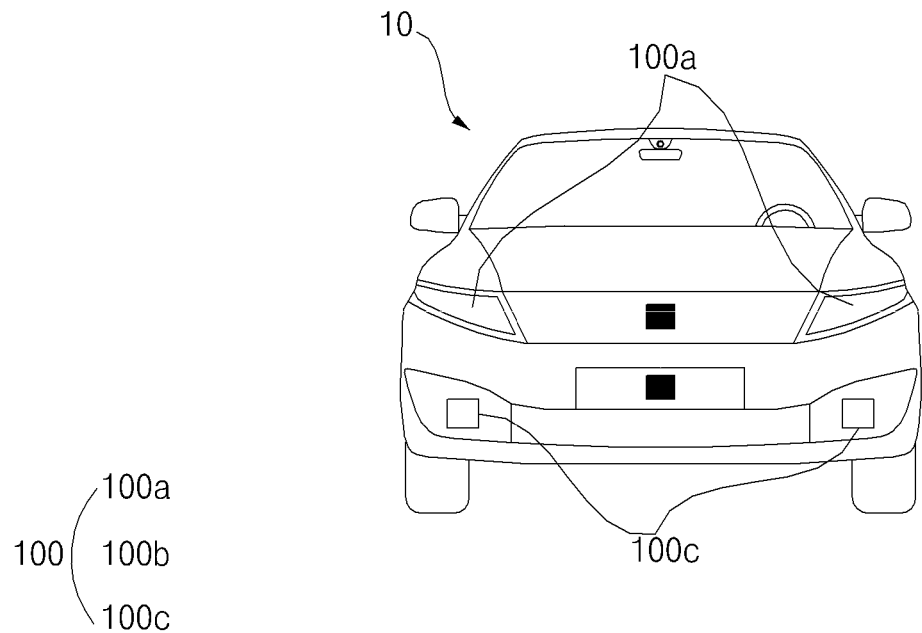
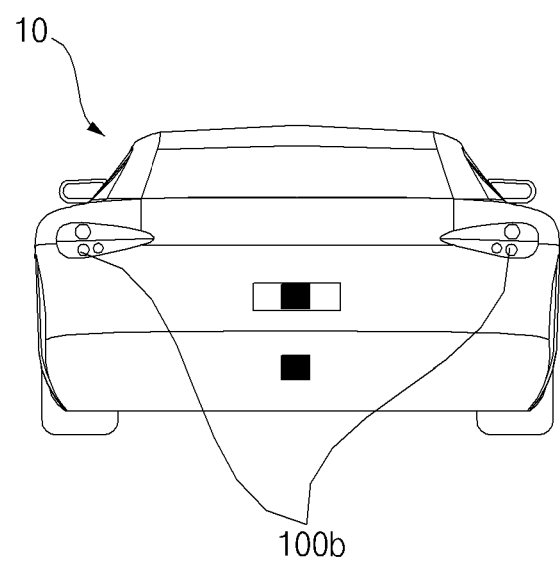

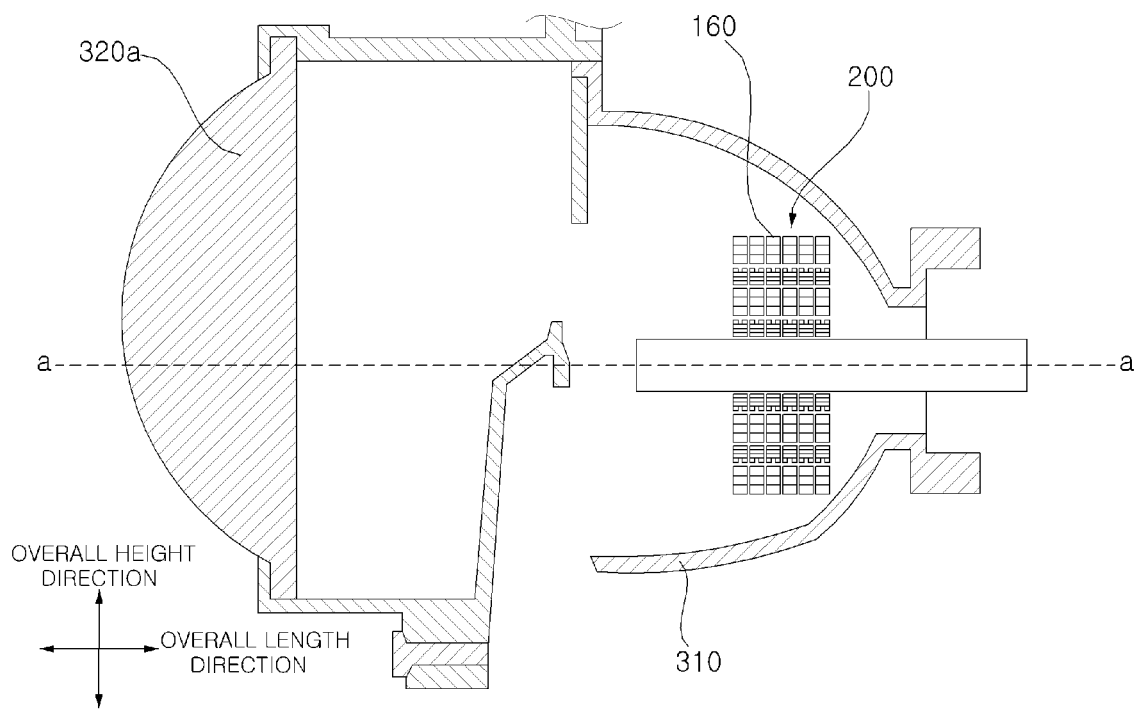

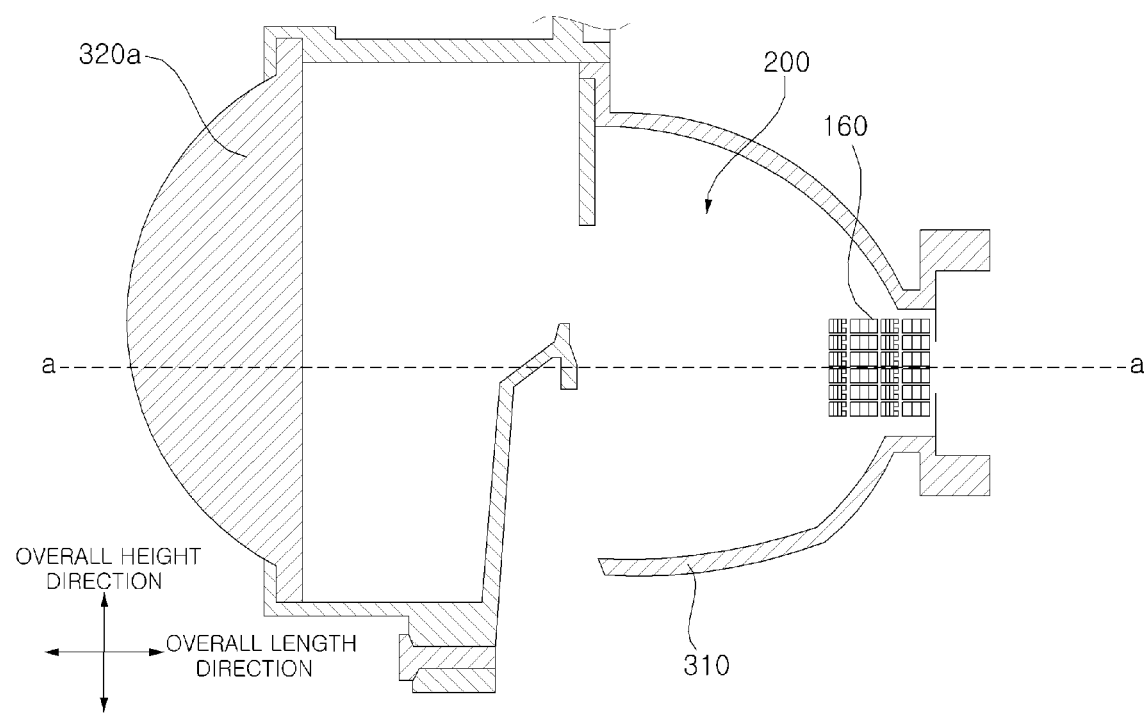

200

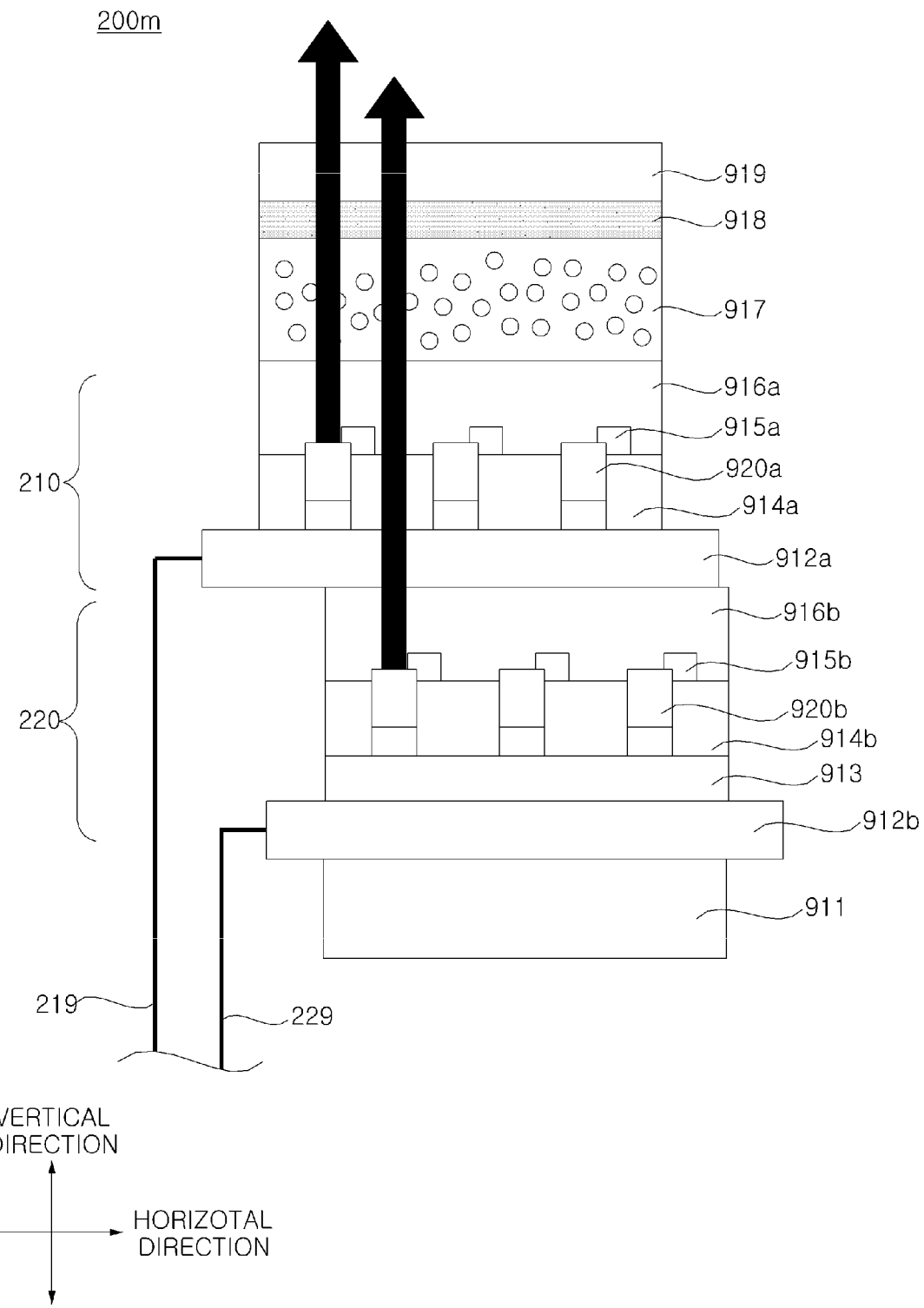

FIG. 17
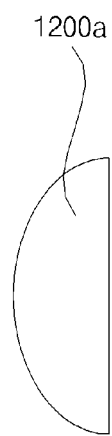
1200a
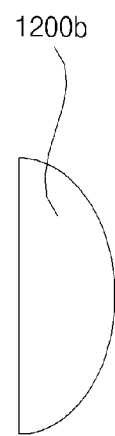
1200b
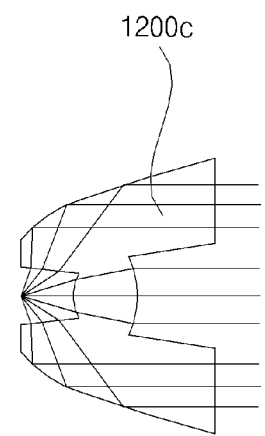
1200c

LAMP FOR VEHICLE AND VEHICLE

CROSS-REFERENCE TO RELATED APPLICATION

This application claims the priority benefit of Korean Patent Application No. 10-2018-0004682, filed on Jan. 12, 2018, in the Korean Intellectual Property Office, the disclosure of which is incorporated herein by reference.

FIELD

The present disclosure relates to a lamp for a vehicle, and the vehicle.

BACKGROUND

A vehicle is an apparatus that can transport a user in a direction desired by the user. One example of a vehicle may be an automobile.

A vehicle may include a lamp for securing visibility for a driver (e.g., a head lamp and a fog lamp) and a lamp for notifying a simple signal (e.g., a turn-signal lamp, and a rear combination lamp).

Recently, there is an interest in dynamically outputting light in a specific pattern.

In some cases, as a number of components are located within a limited volume in a vehicle, and it is of interest to minimize sizes of vehicle components.

SUMMARY

The present disclosure provides a lamp for a vehicle that occupies a small volume and that dynamically outputs light in one or more patterns.

The present disclosure also provides a vehicle including the lamp.

Objects of the present disclosure should not be limited to the aforementioned objects and other unmentioned objects will be clearly understood by those skilled in the art from the following description.

According to one aspect of the subject matter described in this application, a lamp for a vehicle includes a cover lens, a housing that is coupled to the cover lens and that defines a lamp space with the cover lens, a light output unit including a plurality of light generation groups that are arranged inside of the lamp space in a first direction, and a light guide that has a three-dimensional (3D) shape and that is configured to guide light from the light output unit in a light output direction. The light guide includes: a first surface that defines a portion of the 3D shape of the light guide and that faces the light output unit, and a second surface that defines a portion of the 3D shape of the light guide and that defines an acute angle with respect to the first surface.

Implementations according to this aspect may include one or more of the following features. For example, each of the plurality of light generation groups may include an array module comprising a plurality of micro Light Emitting Diodes (LEDs). In some examples, the first surface extends in the first direction in which the plurality of light generation groups are arranged in the lamp space.

In some implementations, at least one of the plurality of light generation groups is oriented to a direction that is different from one or more directions in which other of the plurality of light generation groups are oriented. In some implementations, the light guide further includes: an optical pattern unit located at the second surface, where the optical pattern unit defines a plurality of optical patterns at portions of the light guide, respectively; and an optical path changing unit located at the first surface and configured to change optical paths of light generated by the plurality of light generation groups to the plurality of optical patterns, respectively.

In some implementations, a number of the plurality of optical patterns corresponds to a number of the plurality of light generation groups. In some implementations, each of the plurality of optical patterns includes a plurality of protruding portions, where sizes of the plurality of protruding portions increase based on an increase of a distance between the light output unit and each of the plurality of protruding portions. In some implementations, each of the plurality of optical patterns includes a plurality of protruding portions, where intervals between adjacent protruding portions of the plurality of protruding portions decrease based on an increase of a distance between the light output unit and each of the plurality of protruding portions.

In some implementations, the plurality of optical patterns of the optical pattern unit include: a first optical pattern spaced apart from the light output unit by a first distance; and a second optical pattern spaced apart from the light output unit by a second distance greater than the first distance, where a distance between the first optical pattern and the cover lens is greater than a distance between the second optical pattern and the cover lens.

In some implementations, the optical path changing unit includes a plurality of collimators, where a number of the plurality of collimators corresponds to a number of the plurality of light generation groups. In some examples, the light output unit includes: a first light generation group spaced apart from the cover lens by a first distance; and a second light generation group spaced apart from the cover lens by a second distance less than the first distance. The plurality of collimators may include: a first collimator configured to receive light generated by the first light generation group, and a second collimator configured to receive light generated by the second light generation group, where an optical path from the first collimator to the optical pattern unit is shorter than an optical path from the second collimator to the optical pattern unit.

In some implementations, the light guide further includes a third surface that defines a portion of the 3D shape of the light guide and that defines an acute angle with respect to the second surface. In some examples, the third surface defines a right angle or an obtuse angle with respect to the first surface.

In some implementations, the lamp may further include at least one processor configured to control the light output unit, where the processor is configured to control a sequence and a period of activation of one or more of the plurality of light generation groups. In some examples, the processor is further configured to, in a state in which at least one of the plurality of light generation groups is turned on, turn on a rest of the plurality of light generation groups sequentially. In some examples, the processor is further configured to, in a state in which all of the plurality of light generation groups are turned on, turn off all of the plurality of light generation groups simultaneously.

In some implementations, the lamp may further include at least one processor configured to control the light output unit. The processor may be configured to: control each of the plurality of micro LEDs included in each of the plurality of light generation groups, and to turn on the plurality of micro LEDs sequentially in a predetermined period. In some examples, the light output unit includes: a first light generation group comprising a first portion of the plurality of micro LEDs; and a second light generation group disposed adjacent to the first light generation group, where the second light generation group includes a second portion of the plurality of micro LEDs. The processor may be further configured to, in a state in which all of the first portion of the plurality of micro LEDs are turned on, turn on the second portion of the plurality of micro LEDs sequentially.

In some implementations, the light output unit includes: a first light generation group located at a center position of the plurality of light generation groups. The first light generation group may include a first portion of the plurality of micro LEDs. A second portion of the plurality of micro LEDs may be arranged both in a first side of the center position and in a second side of the center position opposite to the first side. The processor may be further configured to: turn on the first portion of the plurality of micro LEDs included in the first light generation group; and after turning on the first portion of the plurality of micro LEDs, turn on the second portion of the plurality of micro LEDs sequentially in directions from the center position to the first side and to the second side.

In some implementations, the light output unit further includes: a second light generation group disposed adjacent to the first light generation group in the first side, the second light generation group comprising a second portion of the plurality of micro LEDs; and a third light generation group disposed adjacent to the first light generation group in the second side, the third light generation group comprising a third portion of the plurality of micro LEDs. The processor may be further configured to, in a state in which all of the first portion of the plurality of micro LEDs are turned on: turn on the second portion of the plurality of micro LEDs included in the second light generation group sequentially; and turn on the third portion of the plurality of micro LEDs included in the third light generation group sequentially.

In some implementations, the light output unit is configured to indicate a turn-signal of the vehicle.

The details of other implementations are included in the following description and the accompanying drawings.

The implementations of the present disclosure have one or more effects as follows.

First, for example, a person located outside a vehicle may recognize a signal more accurately when the signal is transmitted using light in a light output pattern.

Second, a small number of light sources may implement a light output pattern, which enables reduction of manufacturing costs.

Third, by minimizing a space occupied by a light output unit, it is possible to minimize an impact to an electronic component.

Effects of the present disclosure should not be limited to the aforementioned effects and other unmentioned effects will be clearly understood by those skilled in the art from the claims.

BRIEF DESCRIPTION OF THE DRAWINGS

The implementations will be described in detail with reference to the following drawings in which like reference numerals refer to like elements.

FIG. 1 is a diagram illustrating an example exterior appearance of an example vehicle.

FIGS. 3A to 3C are diagrams illustrating examples of a lamp for a vehicle.

FIG. 8 is a diagram illustrating an example array module in which a plurality of micro LED chips are arranged.

FIG. 17 is a diagram illustrating an example optical path changing unit of an example light guide.

DETAILED DESCRIPTION

Figure 2:
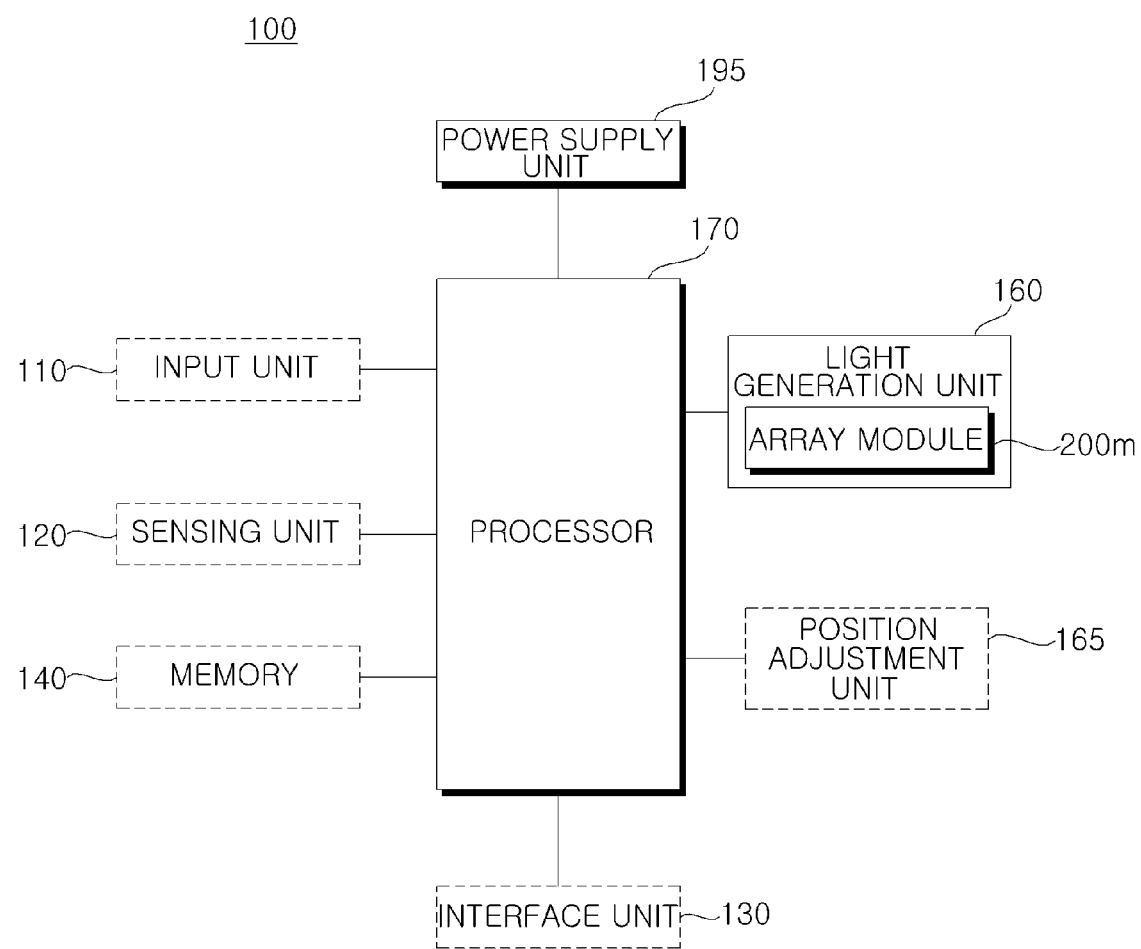
FIG. 2 is a block diagram illustrating an example lamp for a vehicle.

Hereinafter, the implementations disclosed in the present specification will be described in detail with reference to the accompanying drawings, and the same or similar elements are denoted by the same reference numerals even though they are depicted in different drawings and redundant descriptions thereof will be omitted.

A vehicle as described in this specification may include, but not be limited to, an automobile and a motorcycle. Hereinafter, a description will be given based on an automobile.

A vehicle as described in this specification may include one or more of an internal combustion engine vehicle including an engine as a power source, a hybrid vehicle including both an engine and an electric motor as a power source, or an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

In the following description, an array module 200m may include one or more arrays.

The array module 200m may include one or more layers, and one array may be disposed on one layer.

FIG. 1 is a diagram illustrating an example exterior appearance of an example vehicle.

Referring to FIG. 1, a vehicle 10 may include a lamp 100.

The lamp 100 may include a head lamp 100a, a rear combination lamp 100b, and a fog lamp 100c.

The lamp 100 may further include a room lamp, a turn signal lamp, a daytime running lamp, a back lamp, a positioning lamp, etc.

In some implementations, the term "overall length" refers to the length from the front end to the rear end of the vehicle 10, the term "overall width" refers to the width of the vehicle 10, and the term "overall height" refers to the height from the bottom of the wheel to the roof. In the following description, the term "overall length direction L" may be the reference direction for the measurement of the overall length of the vehicle 10, the term "overall width direction W" may be the reference direction for the measurement of the overall width of the vehicle 10, and the term "overall height direction H" may be the reference direction for the measurement of the overall height of the vehicle 10.

FIG. 2 is a block diagram illustrating an example lamp for a vehicle.

Referring to FIG. 2, the lamp 100 may include a light output unit 160, a processor 170, and a power supply unit 195.

The lamp 100 may further include an input unit 110, a sensing unit 120, an interface unit 130, a memory 140, and a position adjustment unit 165 individually or in combination thereof. In some implementations, the lamp 100 may include one or more processors 170 that are configured to control at least one of the input unit 110, the sensing unit 120, the interface unit 130, the memory 140, the light output unit 160, or the position adjustment unit 165.

The input unit 110 may receive a user input for controlling the lamp 100.

The input unit 110 may include one or more input devices. For example, the input unit 110 may include at least one selected from among a touch input device, a mechanical input device, a gesture input device, and a sound input device.

The input unit 110 may receive a user input for controlling operation of the light output unit 160.

For example, the input unit 110 may receive a user input for turning on or off the light output unit 160.

The sensing unit 120 may include one or more sensors.

For example, the sensing unit 120 may include either or both of a temperature sensor and an illumination sensor.

The sensing unit 120 may acquire temperature information of the light output unit 160.

The sensing unit 120 may acquire illumination information about the outside of the vehicle 10.

The interface unit 130 may exchange information, data, or a signal with another device provided in the vehicle 10.

The interface unit 130 may transmit at least one of information, data, or a signal, received from another device provided in the vehicle 10, to the processor 170.

The interface unit 130 may transmit at least one of information, data, or a signal, generated by the processor 170, to another device provided in the vehicle 10.

The interface unit 130 may receive driving situation information.

The driving situation information may include at least one of the following: information about an object outside the vehicle 10, navigation information, or vehicle state information.

The information about an object outside the vehicle 10 may include the following: information about the presence of the object, information about a location of the object, information about movement of the object, information about a distance between the vehicle 10 and the object, information about a relative speed between the vehicle 10 and the object, and information about a type of the object.

The information about the object may be generated by an object detection apparatus provided in the vehicle 10. The object detection apparatus may detect an object based on sensing data generated by one or more of a camera, a radar, a lidar, an ultrasonic sensor, and an infrared sensor.

The object may include a line, another vehicle, a pedestrian, a two-wheeled vehicle, a traffic sign, light, a road, a structure, a bump, a geographic feature, an animal, etc.

The navigation information may include at least one of the following: map information, information on a set destination, information on a route to the set destination, and information on various object located along the route, lane information, and information on the current location of the vehicle 10.

The navigation information may be generated by a navigation device provided in the vehicle 10.

The vehicle state information may include at least one of the following: vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, or vehicle engine temperature information, among other things.

The vehicle state information may be generated based on sensing information about any of various sensors provided in the vehicle 10.

The memory 140 may store basic data for each unit of the lamp 100, control data for the operational control of each unit of the lamp 100, and input/output data of the lamp 100.

The memory 140 may be any of various hardware storage devices, such as a ROM, a RAM, an EPROM, a flash drive, and a hard drive.

The memory 140 may store various data for the overall operation of the lamp 100, such as programs for the processing or control of the processor 170.

The memory 140 may be classified as a sub-element of the processor 170.

The light output unit 160 may convert electrical energy into light energy under the control of the processor 170.

The light output unit 160 may include an array module 200m in which multiple groups of micro Light Emitting Diode (LED) chips are arranged.

The array module 200m may be formed flexible.

For example, the array 200 may be formed flexible in a manner such that a Flexible Copper Clad Laminated (FCCL) substrate is disposed on a polyimide (PI) layer and then LED chips each few micrometers (um) are transferred onto the FCCL substrate.

The array module 200m may include one or more micro LED arrays 200.

In some implementations, the array module 200m may be formed such that a plurality of arrays are stacked on each other.

The multiple groups of micro LED chips may have different shapes.

A micro LED chip may be referred to as a micro LED light emitting device package.

A micro LED chip may include a light emitting device.

A micro LED chip may be of a few micrometers (um). For example, a micro LED chip may be 5-15 um.

Alight emitting device of a micro LED chip may be transferred onto a substrate.

The array 200 may include a substrate, and a unit array in which a plurality of micro LED chips are arranged. In the array, one or more unit arrays may be provided.

The unit array may have any of various shapes.

For example, the unit array may be in the shape of a figure of a predetermined area.

For example, the unit array may be in the shape of a circle, a polygon, a fan, etc.

It is desirable that the substrate include an FCCL substrate.

For example, a base 911 (see FIG. 5) and a first electrode 912 (see FIG. 5) may make up the substrate.

For example, a base 911 (see FIG. 8) and a second anode 912b (see FIG. 8) may make up a substrate.

In some implementations, the array module 200m may function as a surface light source.

The position adjustment unit 165 may adjust position of the light output unit 160.

The position adjustment unit 165 may control the light output unit 160 to be tilted. Due to the tilting control of the light output unit 160, an output light may be adjusted in an upward-downward direction (e.g., an overall height direction).

The position adjustment unit 165 may control the light output unit 160 to be panned. Due to the panning control of the light output unit 160, an output light may be adjusted in a left-right direction (e.g., an overall width direction).

The position adjustment unit 165 may further include a driving force generation unit (e.g., a motor, an actuator, and a solenoid) which provides a driving force required to adjust a position of the light output unit 160.

When the light output unit 160 generates a low beam, the position adjustment unit 165 may adjust a position of the light output unit 160 so that the light output unit 160 outputs a light downward further than when generating a high beam.

When the light output unit 160 generates a high beam, the position adjustment unit 165 may adjust a position of the light output unit 160 so that the light output unit 160 outputs a light upward further than when generating a low beam.

The processor 170 may be electrically connected to each unit of the lamp 100. The processor 170 may control overall operation of each unit of the lamp 100.

The processor 170 may control the light output unit 160.

The processor 170 may control the light output unit 160 by adjusting an amount of electrical energy to be supplied to the light output unit 160.

The processor 170 may control the array module 200m on the basis of each region.

For example, the processor 170 may control the array module 200m on the basis of each region by supplying a different amount of electrical energy to micro LED chips arranged in each region of the array module 200m.

The processor 170 may control the array module 200m on the basis of each layer.

A plurality of layers in the array module 200m may be composed of a plurality of arrays 200.

For example, the processor 170 may control the array module 200m on the basis of each layer by supplying a different amount of electrical energy to each layer.

Under the control of the processor 170, the power supply unit 195 may supply electrical energy required to operate each unit of the lamp 100. In particular, the power supply unit 195 may be supplied with power from a battery inside the vehicle 10.

Figure 3C:
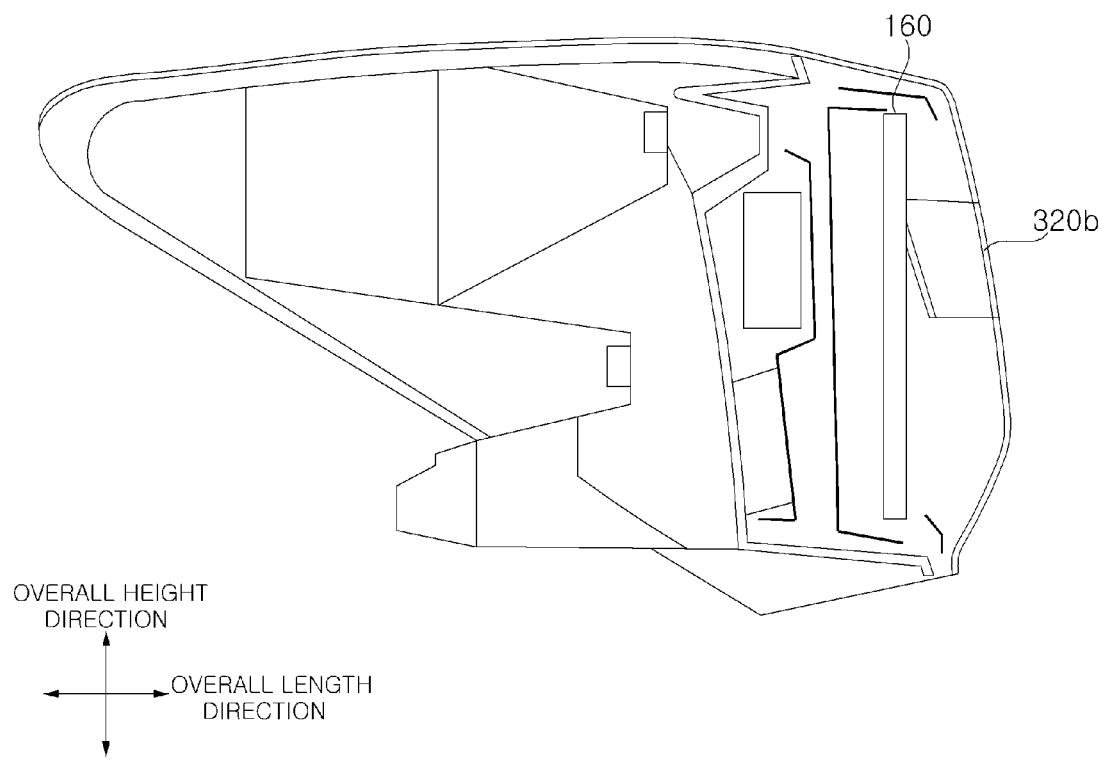

FIGS. 3A to 3C are diagrams illustrating examples of a lamp for a vehicle.

FIGS. 3A and 3B are examples of a section of the lamp 100 implemented as a head lamp 100a.

Referring to FIGS. 3A and 3B, the lamp 100 may include a light output unit 160, a reflector 310, and a lens 320a.

The reflector 310 may reflect light generated by the light output unit 160. The reflector 310 may guide light to be emitted forward or rearward of the vehicle 10.

The reflector 310 may be formed of a highly reflective material, such as aluminum (AL) and silver (Ag), or may be coated on a reflective surface.

The lens 320a may be disposed before the light output unit 160 and the reflector 310. The lens 320a may refract light generated by the light output unit 160 or light reflected by the reflector 310, and allow the refracted light to pass therethrough. The lens 320a may be an aspheric lens.

The lens 320a may change an optical path of light generated by the light output unit 160.

The lens 320a may be formed of a transparent synthetic resin or glass.

As illustrated in FIG. 3A, the light output unit 160 may output light in an overall height direction.

As illustrated in FIG. 3B, the light output unit 160 may output light in an overall length direction.

FIG. 3C is a diagram illustrating an example lamp for a vehicle.

FIG. 3C is an example of a section of the lamp 100 implemented as a rear combination lamp 200b.

Referring to FIG. 3C, the lamp 100 may include a light output unit 160 and a lens 320b.

The lens 320b may cover the light output unit 160. The lens 320b may refract light generated by the light output unit 160, and allow the refracted light to pass therethrough. The lens 320b may be an aspheric lens.

The lens 320b may change an optical path of light generated by the light output unit 160.

The lens 320b may be formed of a transparent synthetic resin or glass.

Figure 4:
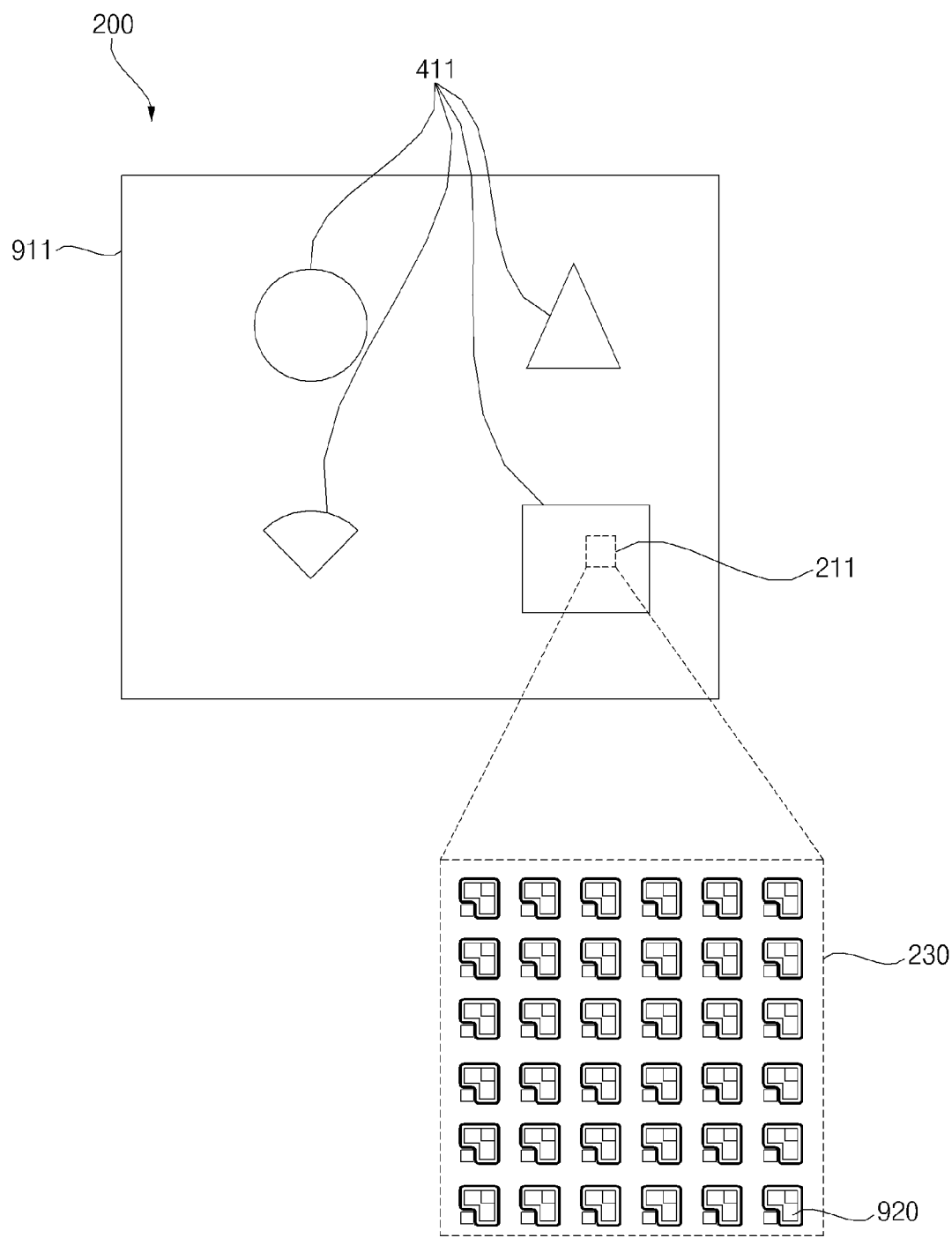
FIG. 4 is a diagram illustrating an example array in which a plurality of micro LED chips are arranged.

FIG. 4 is a diagram illustrating an example array in which a plurality of micro LED chips are arranged.

Referring to FIG. 4, a plurality of micro LED chips 920 may be disposed on an array 200.

The plurality of micro LED chips 920 may be transferred onto the array 200.

Intervals between micro LED chips 920 on the flexible array 200, and a density of micro LED chips 920 (that is, the number of micro LED chips per unit area) on the flexible array 200 may be determined depending on a transfer interval.

The array 200 may include a plurality of unit arrays 411 in which different groups of micro LED chips are arranged respectively.

The array 200 may include a base 911 and one or more unit arrays 411.

The base 911 may be formed of a material such as a polyimide (PI).

In some implementations, the base 911 may be a concept including a polyimide layer and an FCCL substrate disposed on the polyimide layer.

Each of the unit arrays 411 may be disposed on the base 911.

A plurality of micro LED chips 920 may be disposed on each of the unit arrays 411.

The unit arrays 411 may be made by cutting a main array that is an FCCL substrate on which a plurality of micro LED chips 920 is disposed.

In this case, the shape of each unit array 411 may be determined by a shape into which the main array is cut.

For example, each of the unit arrays 411 may have the shape of a two-dimensional figure (e.g., a circle, a polygon, and a fan).

Figure 5:
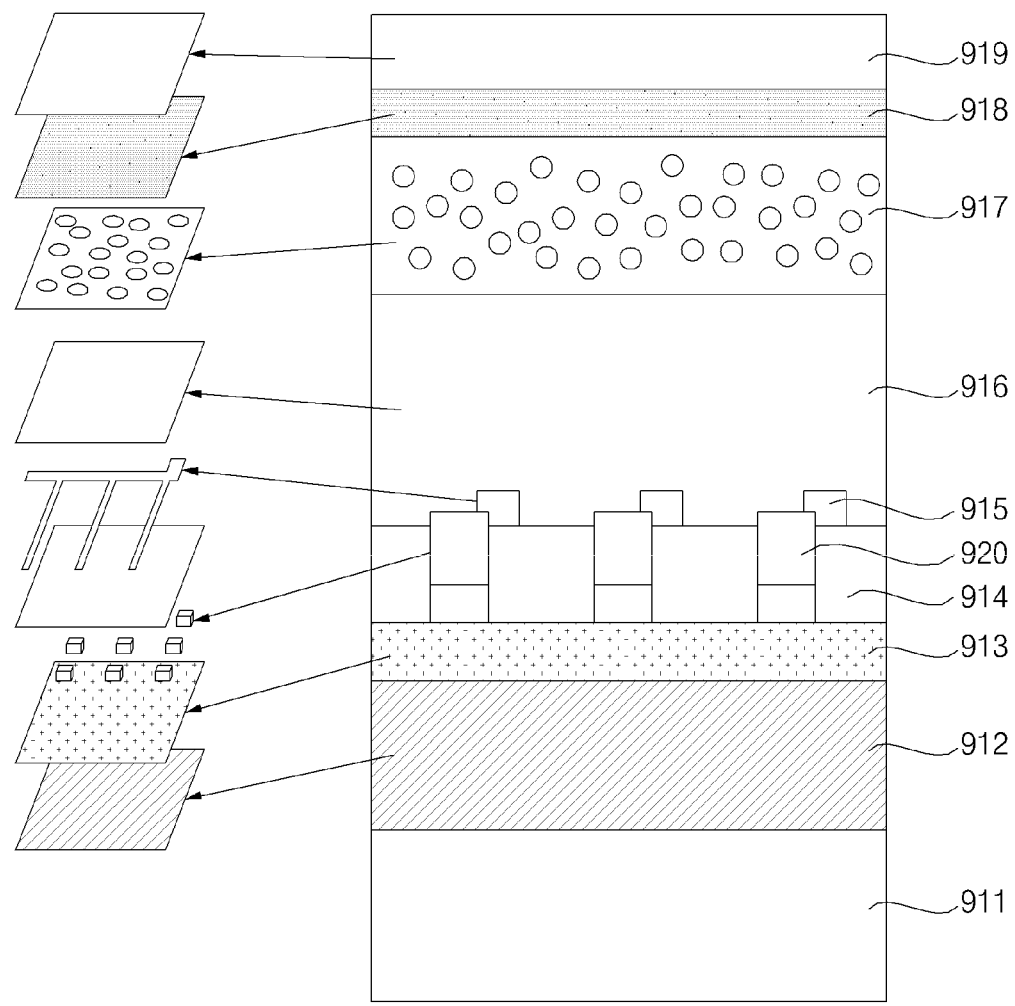
FIG. 5 is a diagram illustrating an example array in which micro LED chips are arranged.

FIG. 5 is a diagram illustrating an example array in which micro LED chips are arranged.

Referring to FIG. 5, the array 200 may include a polyimide layer 911, a FCCL substrate 912, a reflective layer 913, an inter-layer dielectric film 914, a plurality of micro LED chips 920, a second electrode 915, an optical spacer 916, a phosphor layer 917, a color filter film 918, and a cover film 919.

The polyimide layer 911 may be formed flexible.

The FCCL substrate 912 may be formed of copper. The FCCL substrate 912 may be referred to as a first electrode.

In some implementations, the polyimide layer 911 may be referred to as a base.

The first electrode and the second electrode may be electrically connected to the plurality of micro LED chips 920 so as to supply power thereto.

The first electrode 912 and the second electrode 915 may be light transmissive electrodes.

The first electrode 912 may be an anode.

The second electrode 915 may be a cathode.

The first electrode 912 and the second electrode 915 may a metal material which is one or a combination of the following: nickel (Ni), platinum (Pt), ruthenium (Ru), iridium (Ir), rhodium (Rh), tantalum (Ta), molybdenum (Mo), titan (Ti), silver (Ag), tungsten (W), copper (Cu), chromium (Cr), palladium (Pd), vanadium (V), cobalt (Co), niobium (Nb), zirconium (Zr), indium tin oxide (ITO), aluminum zinc oxide (AZO) and Indium Zinc Oxide (IZO).

The first electrode 912 may be formed between the polyimide layer 911 and the reflective layer 913.

The second electrode 915 may be formed on the inter-layer dielectric film 914.

The reflective layer 913 may be formed on the FCCL substrate 912. The reflective layer 913 may reflect light generated by the plurality of micro LED chips 920. It is desirable that the reflective layer 913 may be formed of silver Ag.

The inter-layer dielectric film 914 may be formed on the reflective layer 913.

The plurality of micro LED chips 920 may be formed on the FCCL substrate 912. Each of the plurality of micro LED chips 920 may be attached to the reflective layer 913 or the FCCL substrate 912 using a solder material or an Anisotropic Conductive Film (ACF).

In some implementations, a micro LED chip 920 may be an LEC chip of 10-100 μm.

The optical spacer 916 may be formed on the inter-layer dielectric film 914. The optical spacer 916 may be used to keep a distance between the plurality of micro LED chips 920 and the phosphor layer 917, and may be formed of an insulating material.

The phosphor layer 917 may be formed on the optical spacer 916. The phosphor layer 917 may be formed of resin in which a phosphor is evenly distributed. Depending on a wavelength of light emitted from a micro LED chips 920, any one selected from a blue light-emitting phosphor, a blue-green light-emitting phosphor, a green light-emitting phosphor, a yellow-green light-emitting phosphor, a yellow light-emitting phosphor, a yellow-red light-emitting phosphor, an orange light-emitting phosphor, and a red light-emitting phosphor may be applied as the phosphor.

That is, a phosphor may be excited by light of a first color, which is emitted from the micro LED chips 920, to thereby generate light of a second color.

The color filter film 918 may be formed on the phosphor layer 917. The color filter film 918 may realize a specific color for light which has passed the phosphor layer 917. The color filter film 918 may realize at least one or a combination of red (R), green (G), and blue (B).

The cover film 919 may be formed on the color filter film 918. The cover film 919 may protect the array 200.

The cover film 919 may be formed on the color filter film 918. The cover film 919 may protect the array 200.

Figure 6:
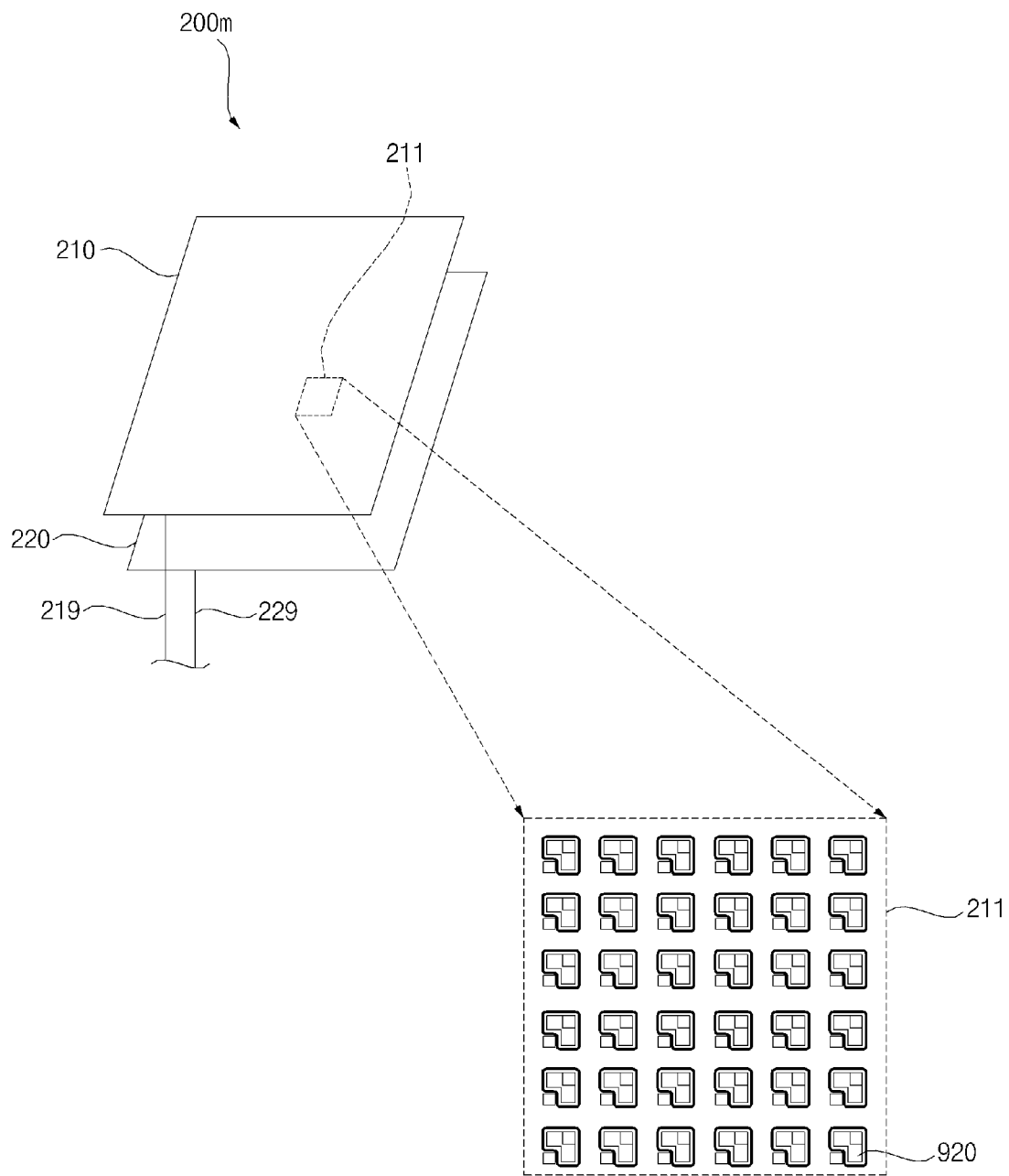
FIG. 6 is a diagram illustrating an example array module.

Referring to FIG. 6, the light output unit 160 may include an array module 200m having a plurality of arrays.

For example, the light output unit 160 may include a first array 210 and a second array 220.

The first array 210 may be different from the second array 220 in terms of at least one of: intervals between a plurality of micro LED chips, positions of the plurality of micro LED chips, or a density of the plurality of micro LED chips.

The second array 220 may be different from the first array 210 in terms of at least one of: intervals between a plurality of micro LED chips, positions of the plurality of micro LED chips, or a density of the plurality of micro LED chips.

The density of the plurality of micro LED chips indicates the number of micro LED chips per unit area.

A first group of micro LED chips may be disposed on the first array 210 in a first pattern.

The first pattern may be determined by at least one of the following: intervals between micro LED chips in the first group, positions of the micro LED chips in the first group on an array module, or a density of the micro LED chips in the first group.

A plurality of micro LED chips included in the first array 210 may be disposed at a first interval.

A plurality of micro LED chips included in the first group may be disposed at the first interval.

The second array 220 may be configured such that the plurality of micro LED chips included in the second group is disposed in a second pattern which is different from the first pattern.

The second pattern may be determined by at least one of the following: intervals between the micro LED chips in the second group, positions of the micro LED chips in the second group, or a density of the micro LED chips in the second group.

The plurality of micro LED chips included in the second array 220 may be disposed at an interval as the same as the interval at which the plurality of micro LED chips included in the first array 210 is disposed.

The plurality of micro LED chips included in the second group may be disposed at an interval as the same as the interval at which the plurality of micro LED chips included in the first group is disposed.

That is, the plurality of LED chips included in the second group may be disposed at the first interval.

The plurality of micro LED chips included in the second group may be disposed not to overlap the plurality of micro LED chips included in the first group in a vertical or horizontal direction.

For example, the first group of micro LED chips may be disposed on the first array 210 not to overlap the second group of micro LED chips, when viewed from above with the first array 210 and the second array 220 overlapping each other.

For example, the second group of micro LED may be disposed on the second array 220 not to overlap the first group of micro LED chips, when viewed from above with the second array 220 and the first array 210 overlapping each other.

Due to such arrangement, it is possible to minimize intervention of the micro LED chips belonging to the first group in output power from the micro LED chips belonging to the second group.

In some implementations, the light output unit 160 may include three or more arrays.

Figure 7A:
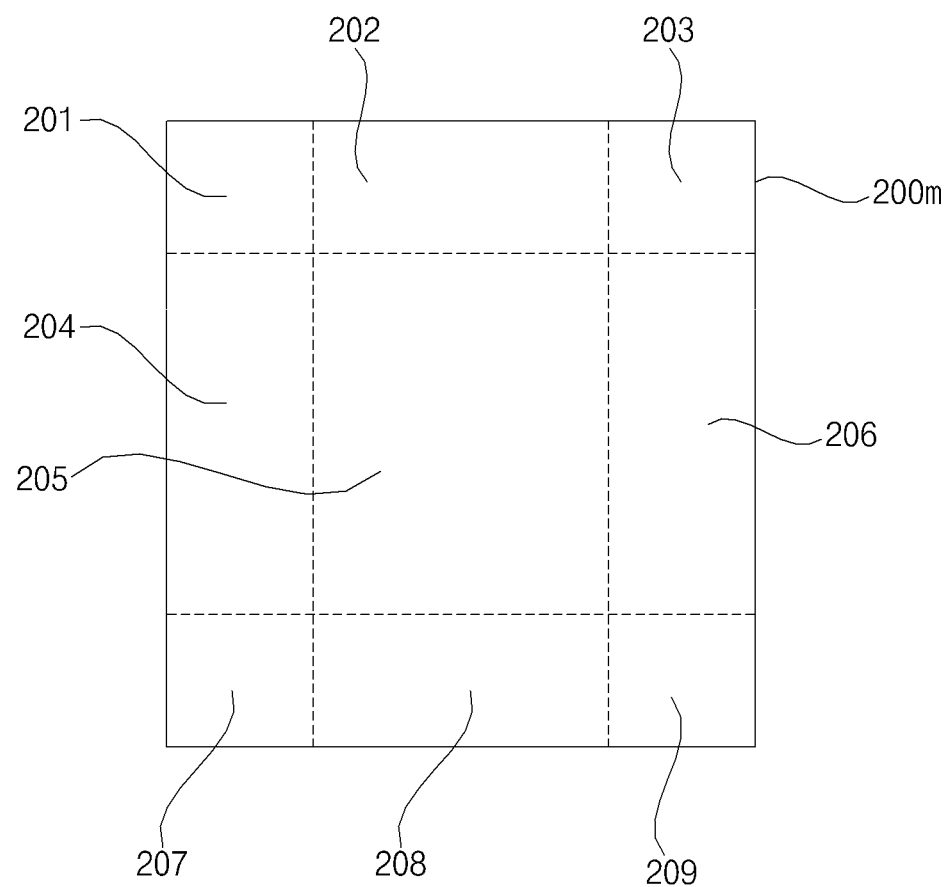
FIG. 7A is an example of a top view of an integrated array module.

FIG. 7A is an example of a top view of an integrated array module.

Figure 7B:
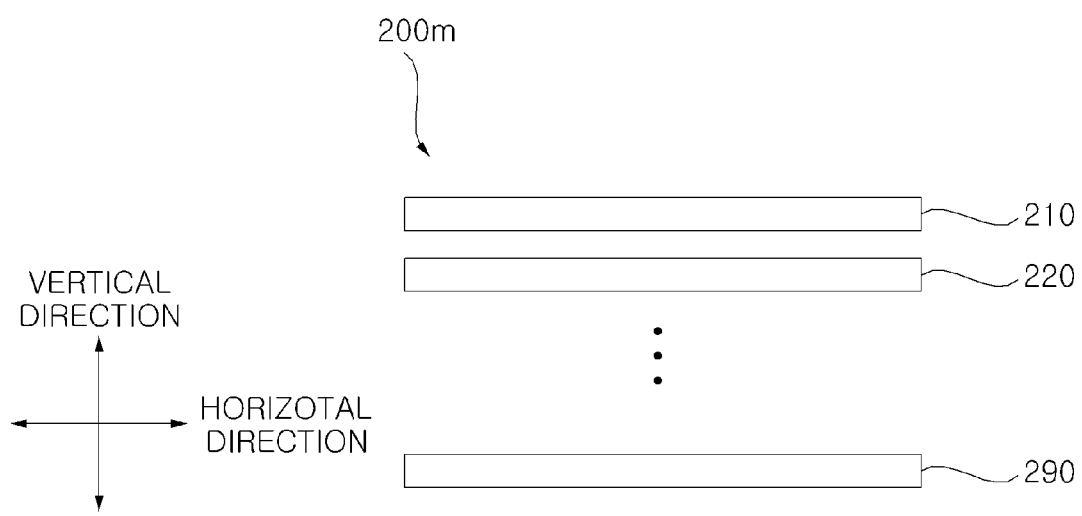
FIG. 7B is an example of a side view of an integrated array module.

FIG. 7B is an example of a side view of an integrated array module.

Referring to FIGS. 7A and 7B, the processor 170 may control the array module 200*m* on the basis of each region (regions 201 to 209).

The processor 170 may adjust a light distribution pattern by controlling the array module 200*m* on the basis of each region.

The array module 200*m* may be divided into a plurality of regions 201 to 209.

The processor 270 may adjust an amount of electrical energy to be supplied to each of the plurality of regions 201 to 209.

The processor 170 may control the array module 200*m* on the basis of each layer.

The processor 270 may adjust an amount of output light by controlling the array module 200*m* on the basis of each layer.

The array module 200*m* may be composed of a plurality of layers. The plurality of layers may be composed of a plurality of arrays, respectively.

For example, a first layer of the array module 200*m* may be formed by a first array, and a second layer of the array module 200*m* may be formed by a second array.

The processor 270 may adjust an amount of electrical energy to be supplied to each of the plurality of layers.

FIG. 8 is a diagram illustrating an example array module in which a plurality of micro LED chips is arranged.

FIG. 8 shows an example in which the array module 200*m* includes a first array 210 and a second array 220, but the array module 200*m* may include three or more arrays.

Referring to FIG. 8, the array module 200*m* may include a polyimide layer 911, the first array 210, and a second array 220.

In some implementations, the array module 200*m* may further include a phosphor layer 917, a color filter film 918, and a cover film 919 individually or in combination thereof.

The polyimide layer 911 may be flexible.

The second array 220 may be disposed on the base 911.

In some implementations, a layer composed of the polyimide layer 911 or a second anode 912*b* may be referred to as a base.

In some implementations, the polyimide layer 911 may be referred to as a base.

The second array 220 may be disposed between the first array 210 and the base 911.

The second array 220 may include a second anode 912*b*, a reflective layer 913, a second inter-layer dielectric film 914*b*, a second group of micro LED chips 920*b*, a second optical spacer 916*b*, and a second cathode 915*b*.

The second anode 912*b* may be an FCCL substrate. The second anode 912*b* may be formed of copper.

The second anode 912*b* and the second cathode 915*b* may be light transmissive electrodes.

The second anode 912*b* and the second cathode 915*b* may be referred to as transparent electrodes.

The second array 220 may include a transparent electrode.

The second anode 912*b* and the second cathode 915*b* may include a metal material which is one or a combination of the following: nickel (Ni), platinum (Pt), ruthenium (Ru), iridium (Ir), rhodium (Rh), tantalum (Ta), molybdenum (Mo), titan (Ti), silver (Ag), tungsten (W), copper (Cu), chromium (Cr), palladium (Pd), vanadium (V), cobalt (Co), niobium (Nb), zirconium (Zr), indium tin oxide (ITO), aluminum zinc oxide (AZO) and Indium Zinc Oxide (IZO).

The second anode 912*b* may be formed between the base 911 and the reflective layer 913.

The second cathode 915*b* may be formed on the second inter-layer dielectric film 914*b*.

The reflective layer 913 may be formed on the second anode 912*b*. The reflective layer 913 may reflect light generated by the plurality of micro LED chips 920. It is desirable that the reflective layer 913 may be formed of silver Ag.

The second inter-layer dielectric film 914*b* may be formed on the reflective layer 913.

The second group of micro LED chips 920*b* may be formed on the second anode 912*b*. Each micro LED chip 920*b* belonging to the second group may be attached to the reflective layer 913 or the second anode 912*b* using a solder material or an Anisotropic Conductive Film (ACF).

The second optical spacer 916*b* may be formed on the second inter-layer dielectric film 914*b*. The second optical spacer 916*b* is used to keep the micro LED chips 920*b* and the first flexible array 210 at a distance from each other, and the second optical spacer 916*b* may be made of an insulating material.

The first array 210 may be formed on the second array 220.

The first array 210 may include a first anode 912*a*, a first inter-layer dielectric film 914*a*, a first group of micro LED chips 920*a*, a first optical spacer 916*a*, and a first cathode 915*a*.

The first anode 912*a* may be a FCCL substrate. The first anode 912*a* may be formed of copper.

The first anode 912*a* and the first cathode 915*a* may be light transmissive electrodes.

The first anode 912*a* and the first cathode 915*a* may be referred to as transparent electrodes.

The first array 210 may include a transparent electrode.

The first anode 912*a* and the first cathode 915*a* may include a metal material which is one or a combination of the following: nickel (Ni), platinum (Pt), ruthenium (Ru), iridium (Ir), rhodium (Rh), tantalum (Ta), molybdenum (Mo), titan (Ti), silver (Ag), tungsten (W), copper (Cu), chromium (Cr), palladium (Pd), vanadium (V), cobalt (Co), niobium (Nb), zirconium (Zr), indium tin oxide (ITO), aluminum zinc oxide (AZO) and Indium Zinc Oxide (IZO).

The first anode 912*a* may be formed between the second optical spacer 916*b* and the first inter-layer dielectric film 914*a*.

The first cathode 915*a* may be formed on the first inter-layer dielectric film 914*a*.

The first inter-layer dielectric film 914*a* may be formed on the first anode 912*a*.

The first group of micro LED chips 920*a* may be formed on the first anode 912*a*. Each micro LED chip 920*a* belonging to the first group may be attached to the first anode 912*a* using a solder material or an Anisotropic Conductive Film (ACF).

The first optical spacer 916*a* may be formed on the first inter-layer dielectric film 914*a*. The first optical spacer 916*a* is used to keep a distance between the first group of micro LED chips 920*a* and the phosphor layer 917, and may be formed of an insulating material.

The phosphor layer 910 may be formed on the first array 210 and the second array 220.

The phosphor layer 917 may be formed on the first optical spacer 916*a*. The phosphor layer 917 may be formed of resin in which a phosphorus is evenly distributed. Depending on a wavelength of light emitted from the micro LED chips 920*a* and 920*b* belonging to the first and second groups, any one selected from a blue light-emitting phosphor, a blue-green light-emitting phosphor, a green light-emitting phosphor, a yellow-green light-emitting phosphor, a yellow light-emitting phosphor, a yellow-red light-emitting phosphor, an orange light-emitting phosphor, and a red light-emitting phosphor may be applied as the phosphor.

The phosphor layer 917 may change a wavelength of lights emitted from first and second micro LED chips 920a and 920b.

The phosphor layer 917 may change a wavelength of a first light generated by the first group of micro LED chips 920a, and a wavelength of a second light generated by the second group of micro LED chips 920b.

The color filter film 918 may be formed on the phosphor layer 917. The color filter film 918 may realize a predetermined color for a light which has passed through the phosphor layer 917. The color filter film 918 may realize at least one or a combination of red (R), green (B), and blue (B).

The cover film 919 may be formed on the color filter film 918. The cover film 919 may protect the array module 200m.

In some implementations, the plurality of micro LED chips 920b included in the second array 220 may be disposed not to overlap the plurality of micro LED chips 920a included in the first array 210 in a vertical or horizontal direction.

The plurality of micro LED chips 920b included in the second group may be disposed not to overlap the plurality of micro LED chips 920a included in the first group in a vertical or horizontal direction.

The vertical direction may be a direction in which the array module 200m is deposited.

The first and second groups of micro LED chips 920a and 920b may output light in the vertical direction.

The horizontal direction may be a direction in which the first and second groups of micro LED chips 920a and 920b are arranged.

The horizontal direction may be a direction in which the base 911, the first and second anodes 912a and 912b, or the phosphor layer 917 extends.

In some implementations, the lamp 100 may further include a wire for supplying power to the array module 200m.

For example, the lamp 100 may include a first wire 219 and a second wire 229.

The first wire 219 may supply power to the first array 210. The first wire 219 may be a pair of wires. The first wire 219 may be connected to the first anode 912a and/or the first cathode 915a.

The second wire 229 may supply power to the second array 220. The second wire 229 may be a pair of wires. The second wire 229 may be connected to the second anode 912b and/or the second cathode 915b.

The first wire 219 and the second wire 229 may be disposed not to overlap each other.

As described above with reference to FIGS. 1 to 8, the lamp 100 may include the array module 200m in which a plurality of micro LED chips is arranged.

Figure 9:
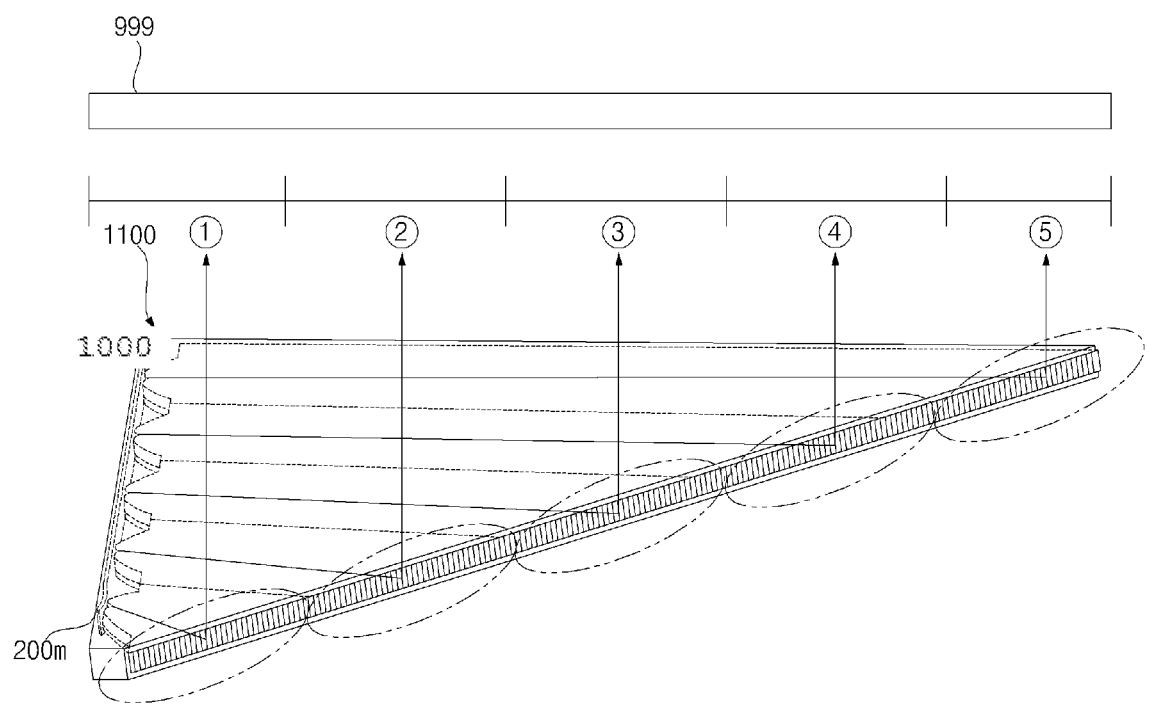
FIG. 9 is a diagram for explaining an example lamp for a vehicle.

FIG. 9 is a diagram for explaining an example lamp for a vehicle.

Referring to FIG. 9, the lamp 100 may include a cover lens 999, a housing, a light output unit 160, and a light guide 1000.

The cover lens 999 may be coupled to the housing to form a space.

The cover lens 999 may be coupled to the housing to accommodate each constituent element of the lamp 100.

The cover lens 999 may protect each constituent element of the lamp 100.

In the space formed by the cover lens 999 and the housing, each constituent element of the lamp 100 may be disposed.

The cover lens 999 may be made of a transparent material to output emit light to the outside of the vehicle 10.

In some implementations, an optic pattern may be formed on at least part of the cover lens 999.

The cover lens 999 may be referred to as an outer lens.

The housing may be coupled to the cover lens 999 to form a space.

The housing may be coupled to the cover lens 999 to accommodate each constituent element of the lamp 100.

The housing may protect each constituent element of the lamp 100.

In the space formed by the housing and the cover lens 999, each constituent element of the lamp 100 may be disposed.

The housing may be made of a synthetic resin material.

The light output unit 160 may be disposed in the space formed by the cover lens 999 and the housing.

The light output unit 160 may include a plurality of light generation groups.

The plurality of light generation groups may be arranged in a first direction in the space formed by the cover lens 999 and the housing.

The first direction may be defined as a direction which a straight line faces within a three-dimensional (3D) space. For example, the first direction may be defined as the overall length direction of the vehicle, or may be defined as a direction that horizontally forms an angle between 0 degree and 30 degrees relative to the overall length direction.

For example, the first direction may be defined as a heading direction of the vehicle or may be defined as a direction that horizontally forms an angle between 0 degree and 30 degrees relative to the heading direction.

For example, the first direction may be defined as a straight-forward direction of travel of the vehicle, or may be defined as a direction that horizontally forms an angle between 0 degree and 30 degrees relative to the straight-forward direction of travel of the vehicle.

For example, the first direction may be defined as the rearward direction of travel of the vehicle, or may be defined as a direction that horizontally forms an angle of between 0 degree and 30 degrees relative to the rearward direction of travel of the vehicle.

Due to the arrangement of the plurality of light generation groups, only part of the plurality of light generation units are found to see when the lamp 100 is viewed from the front or the rear of the vehicle 10.

The plurality of light generation groups may be arranged in a direction in which a first surface 1010 of the light guide 1000 extends.

Due to the above-described arrangement of the plurality of light generation groups, freedom of design of the lamp 100 may improve.

Each of the plurality of light generation groups may include at least one light source that converts electrical energy into light energy.

Each of the plurality of light generation groups may be composed of an array module 200m having a plurality of micro LEDs.

Description about such an array module 200m is the same as described above with reference to FIGS. 1 to 8.

In some implementations, each of the plurality of light generation groups may be composed of at least one from among an incandescent lamp, a halogen lamp, a High Intensity Discharge (HID) lamp, a Light Emitting Diode (LED), and a Laser Diode (LD).

The light guide 1000 may guide light generated by the light output unit 160 to the outside of the vehicle 10.

The light guide 1000 may be disposed in a space formed by the cover lens 999 and the housing.

The light guide 1000 may be formed with a 3D shape having a predetermined volume.

The light guide 1000 may include a plurality of surfaces to form a 3D shape.

The light guide 1000 may guide a light emitting direction.

Figure 10:
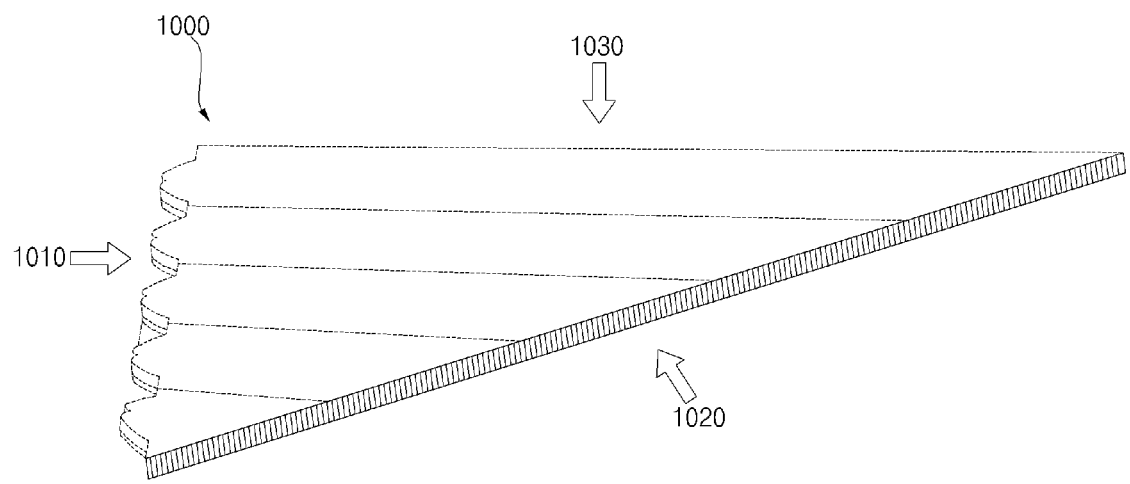
FIG. 10 is a diagram illustrating an example light guide included in an example lamp for a vehicle.

FIG. 10 is a diagram illustrating an example light guide included in an example lamp for a vehicle.

Referring to FIG. 10, the light guide 1000 may be defined as a 3D shape having a predetermined volume.

For example, the light guide 1000 may be a flat shape whose top and bottom surfaces have a larger area than a circumferential surface.

The light guide 1000 may include a plurality of surfaces to define a 3D shape.

The light guide 1000 may include a plurality of surfaces to form a 3D.

The light guide 1000 may include a first surface 1010, a second surface 1020, and a third surface 1030.

The first surface 1010 may define a 3D shape of the light guide 1000.

The first surface 1010 may face the light output unit 160.

The first surface 1010 may extend in a first direction.

The first direction may be defined as a direction which a straight line faces within a 3D space.

On the first surface 1010, an optical path changing unit 1200 may be formed.

Due to the optical path changing unit 1200 formed on the first surface 1010, the first surface 1010 may be uneven.

The optical path changing unit 1200 may be integrally formed with the light guide 1000.

The second surface 1020 may define the 3D shape of the light guide 1000.

The second surface 1020 may form an acute angle relative to the first surface 1010.

The second surface 1020 may extend in a second direction.

The second direction may form a specific angle relative to the first direction.

The second direction may be defined as a direction which a straight line faces within a 3D space.

The second direction may be defined as a direction different from the first direction.

For example, the second direction may be defined as the overall width direction or may be defined as a direction that horizontally forms an angle between 0 degree and 30 degrees relative to the overall width direction.

On the second surface 1020, an optic pattern unit 1300 may be formed.

In some cases, due to the optic pattern unit 1300 defined on the second surface 1020, the second surface 1020 may be uneven.

The optic pattern unit 1300 may be integrally formed with the light guide 1000.

The third surface 1030 may define the 3D shape of the light guide 1000.

The third surface 1030 may form an acute angle relative to the second surface 1020.

The third surface 1030 may form a right angle or an obtuse angle relative to the first surface 1010.

The third surface 1030 may be flat.

The first surface 1010, the second surface 1020, and the third surface 1030 may define the circumferential surface of the light guide 1000.

The light guide 1000 may further include a fifth surface and a sixth surface.

The fifth surface may define the 3D shape of the light guide 1000.

The fifth surface may define the top surface of the light guide 1000.

The sixth surface may define the 3D shape of the light guide 1000.

The sixth surface may define the bottom surface of the light guide 1000.

Each of the fifth and sixth surfaces may roughly have a triangular shape.

Figure 11:
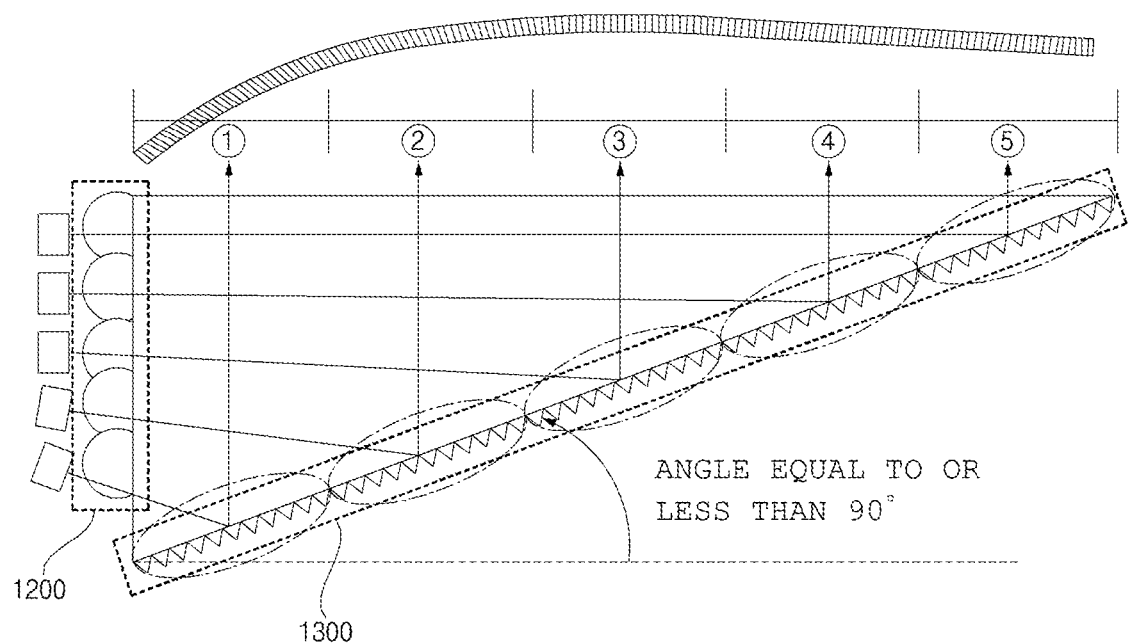
FIGS. 11 and 12 are diagrams illustrating examples of a configuration of a lamp for a vehicle.
Figure 12:
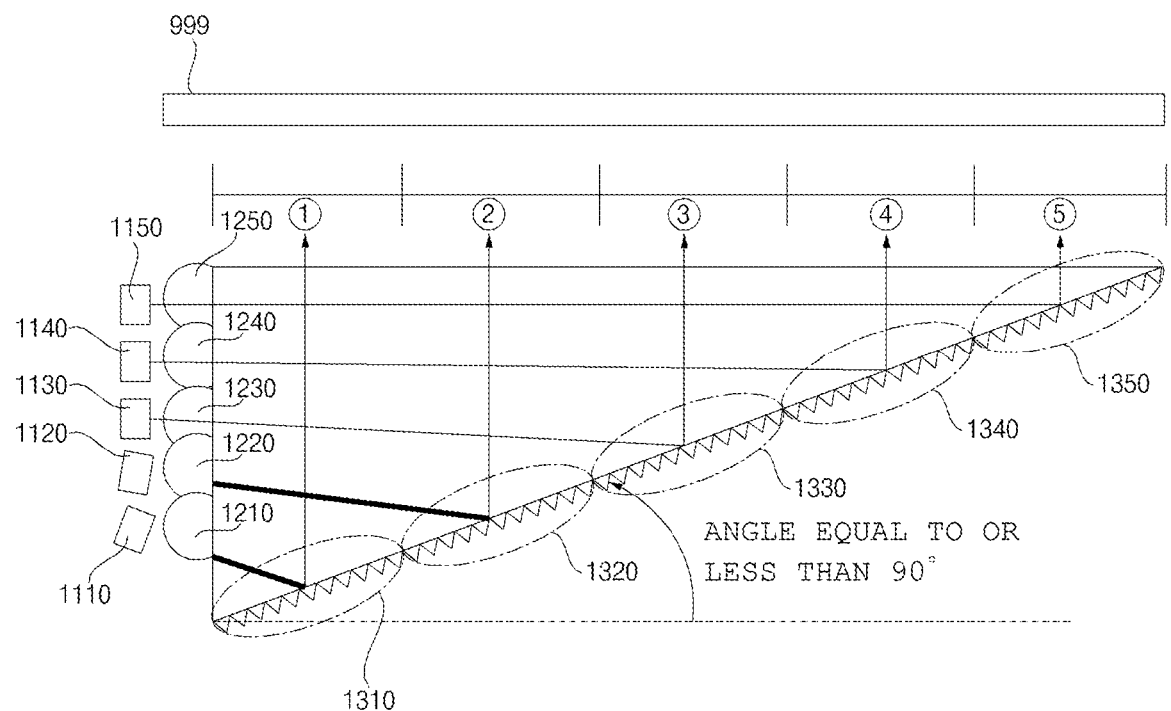

FIGS. 11 and 12 are diagrams illustrating examples of a configuration of a lamp for a vehicle.

The present disclosure is not limited to the number of a plurality of light generation groups and the number of optic patterns shown in FIGS. 11 and 12.

Referring to FIGS. 11 and 12, the light output unit 160 may include a plurality of light generation groups 1110, 1120, 1130, 1140, and 1150.

Each of the plurality of light generation groups 1110, 1120, 1130, 1140, and 1150 may include at least one light source.

Each of the plurality of light generation groups 1110, 1120, 1130, 1140, and 1150 may be implemented as one light source or as two or more light sources.

A direction, which at least one of the plurality of light generation groups 1110, 1120, 1130, 1140, or 1150 faces, may be different from a direction which the rest of the plurality of light generation groups face.

For example, a beam angle of the first light generation group 1110 from among the plurality of light generation groups 1110, 1120, 1130, 1140, and 1150 may be different from a beam angle of at least one light generation group from among the second to fifth light generation groups 1120, 1130, 1140, and 1150.

Due to this structure, light generated by each of the plurality of light generation groups 1110, 1120, 1130, 1140, and 1150 in the light guide 1000 may have a different optical path.

The plurality of light generation groups 1110, 1120, 1130, 1140, and 1150 may respectively have beam angles toward a plurality of optic patterns 1310, 1320, 1330, 1340, and 1350.

The light output unit 160 may include the first to fifth light generation groups 1110, 1120, 1130, 1140, and 1150.

The light guide 1000 may include the optic pattern unit 1300 and the optical path changing unit 1200.

The optic pattern unit may be formed on the second surface 1020.

The optic pattern unit 1300 may form a plurality of optic patterns.

The plurality of optic patterns may be continuously formed on the second surface 1020.

The optic pattern unit 1300 may include a plurality of optic patterns whose number corresponds to the number of a plurality of light generation groups.

For example, the optic pattern unit 1300 may include first to fifth optic patterns 1310, 1320, 1330, 1340, and 1350 to correspond to the first to fifth light generation groups 1110, 1120, 1130, 1140, and 1150, respectively. The first to fifth optic patterns 1310, 1320, 1330, 1340, and 1350 may be continuously and sequentially formed on the second surface 1020.

The optical path changing unit 1200 may be formed on the first surface 1010.

The optical path changing unit 1200 may change optical paths, so that a plurality of lights generated by the plurality of light generation groups 1110, 1120, 1130, 1140, and 1150 is incident on the plurality of optic patterns 1310, 1320, 1330, 1340, and 1350, respectively.

The optical path changing unit 1200 may include a plurality of collimators whose number corresponds to the number of light generation groups.

For example, the optical path changing unit 1200 may include first to fifth lens 1210, 1220, 1230, 1240, and 1250 to correspond to the first to fifth light generation groups 1110, 1120, 1130, 1140, and 1150.

For example, the first to fifth lens 1210, 1220, 1230, 1240, and 1250 may be collimators.

Light generated by the first light generation group 1110 may pass through the first collimator 1210 and be then incident on the first optic pattern 1310. The light incident on the first optic pattern 1310 may be incident on the cover lens 999 because an optical path of the light is changed by the first optic pattern 1310. In this case, the first light generation group 1110 may be in an optimal position for allowing the light, having passing through the first optic pattern 1310, to be directed to the cover lens 999.

Light generated by the second light generation group 1120 may pass through the second collimator 1220 and be then incident on the second optic pattern 1320. The light incident on the second optic pattern 1320 may be incident on the cover lens 999 because an optical path of the light is changed by the second optic pattern 1320. In this case, the second light generation group 1120 may be in an optimized position for allowing the light, having passed through the second optic pattern 1320, to be directed to the cover lens 999.

Light generated by the third light generation group 1130 may pass through the third collimator 1230 and be then incident on the third optic pattern 1330. The light incident on the third optic pattern 1330 may be incident on the cover lens 999 because an optical path of the light is changed by the third optic pattern 1330. In this case, the third light generation group 1130 may be in the optimized position for allowing the light, having passed through the third optic pattern 1330, to be directed to the cover lens 999.

Light generated by the fourth light generation group 1140 may pass through the fourth collimator 1240 and be then incident on the fourth optic pattern 1340. The light incident on the fourth optic pattern 1340 may be incident on the cover lens 999 because an optic path of the light is changed by the fourth optic pattern 1340. In this case, the fourth light generation group 1140 may be in the optimized position for allowing the light, having passed the fourth optic pattern 1340, to be directed to the cover lens 999.

Light generated by the fifth light generation group 1150 may pass through the fifth collimator 1250 and be then incident on the fifth optic pattern 1350. The light incident on the fifth optic pattern 1350 may be incident on the cover lens 999 because an optic path of the light is changed by the fifth optic pattern 1350. In this case, the fifth light generation group 1150 may be in the optimized position for allowing the light, having passed through the fifth optic pattern 1350, to be directed to the cover lens 999.

FIGS. 13 to 16 are diagrams illustrating examples of an optic pattern unit of a light guide.

Referring to FIGS. 13 to 16, each optic pattern of the optic pattern unit 1300 may include either or both a plurality of protruding portions and a plurality of recessed structures.

Either or both the plurality of protruding portions and the plurality of recessed structures may be referred to as roughness.

The size of a protruding portion or a recessed structure may increase as a distance from the light output unit 160 increases.

For example, the size of a protruding portion in the second optic pattern 1320 may be greater than the size of a protruding portion in the first optic pattern 1310.

For example, the sizes of the plurality of protruding portions in the first optic pattern 1310 may increase as a distance from the light output unit 160 increases.

Figure 13:
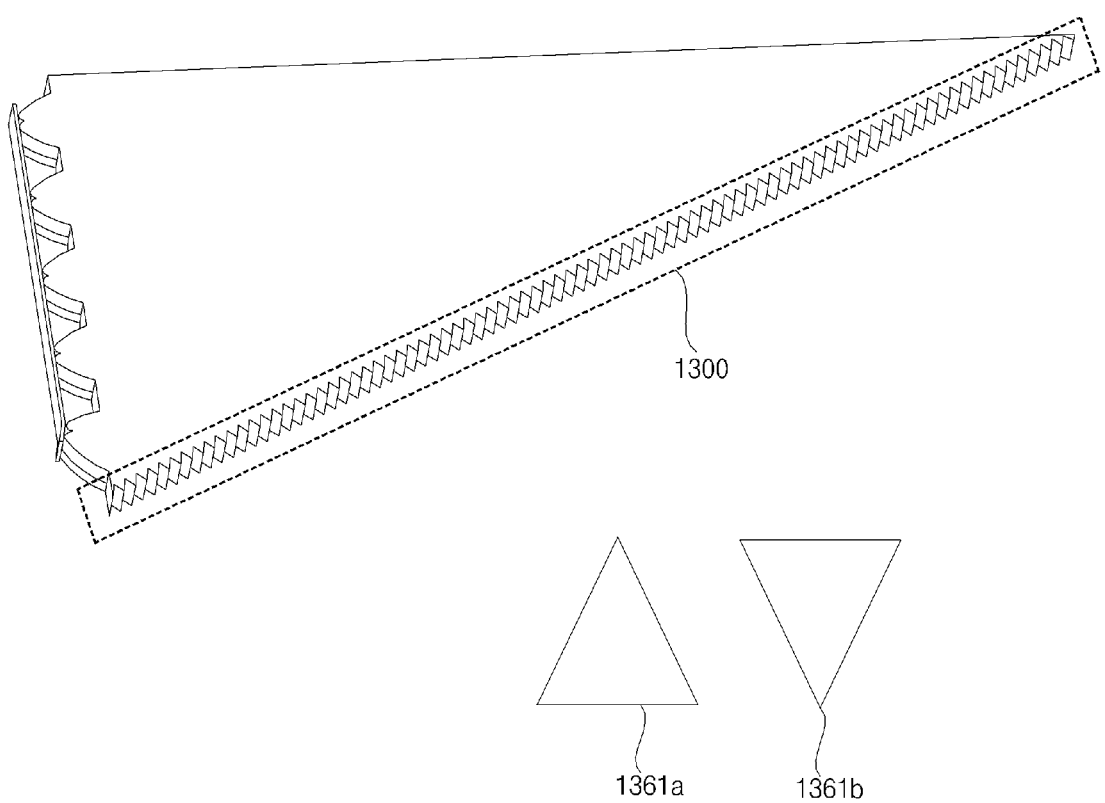
FIGS. 13 to 16 are diagrams illustrating examples of an optic pattern unit of an example light guide.

As illustrated in FIG. 13, each protruding portion or recessed structure may be a shape having a vertex.

For example, each protruding portion or recessed structure may have a triangular cross section 1361a or 1361b.

For example, the plurality of protruding portions or recessed structures may have a sawtooth-shaped cross section.

In some implementations, each of the plurality of optic patterns may have a different vertex angle of a protruding portion.

A vertex angle of a protruding portion may be determined by a position of an optic pattern where the protruding portion is placed.

For example, a vertex angle of a protruding portion in the first optic pattern 1310 may be smaller than a vertex angle of a protruding portion in the second optic pattern 1320. The first optic pattern 1310 may be closer to the light output unit 160 than the second optic pattern 1320 is.

Figure 14:
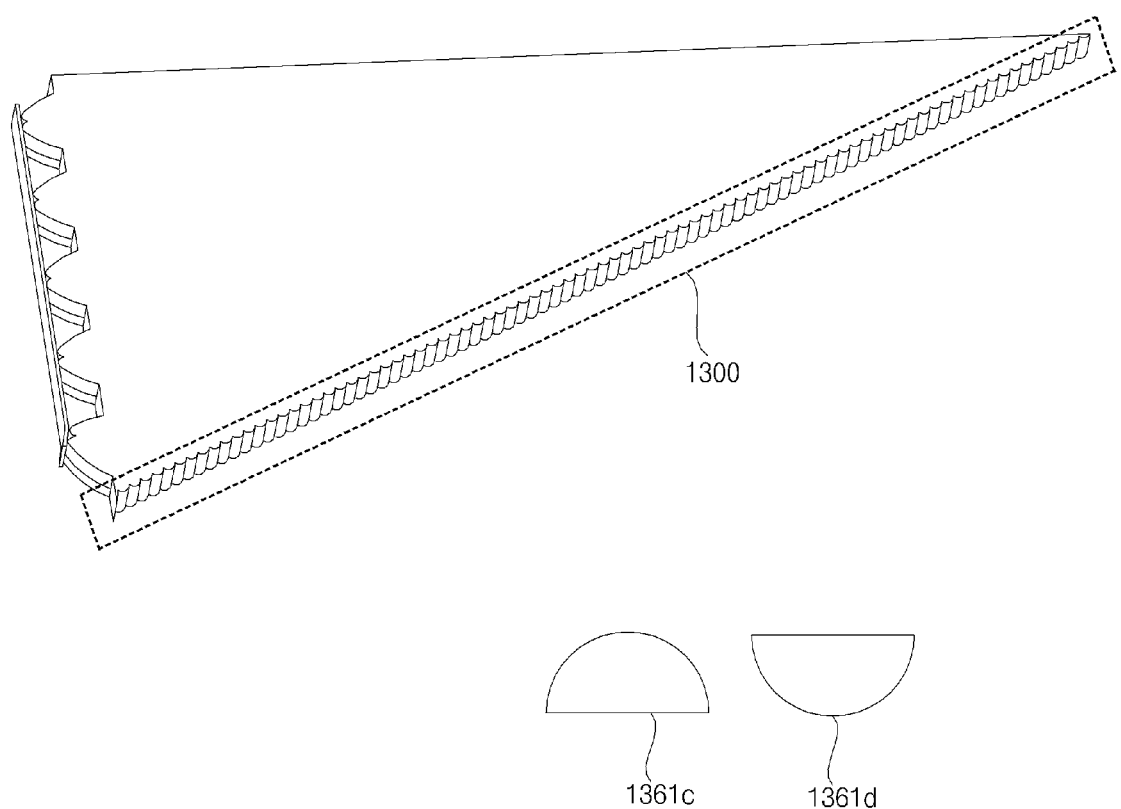

As illustrated in FIG. 14, each protruding portion or recessed structure may be a curved shape with a predetermined curvature.

For example, one protruding portion or recessed structure may have a partially circular-shaped cross section 1361c or 1361d.

In some implementations, each of the plurality of optic patterns may have a different curvature of a protruding portion.

A curvature of a protruding portion may be determined by a position of an optic pattern where the protruding portion is placed.

For example, a curvature of a protruding portion in the first optic pattern 1310 may be greater than a curvature of a protruding portion in the second optic pattern 1320. The first optic pattern 1310 may be closer to the light output unit 160 than the second optic pattern 1320 is.

Figure 15:
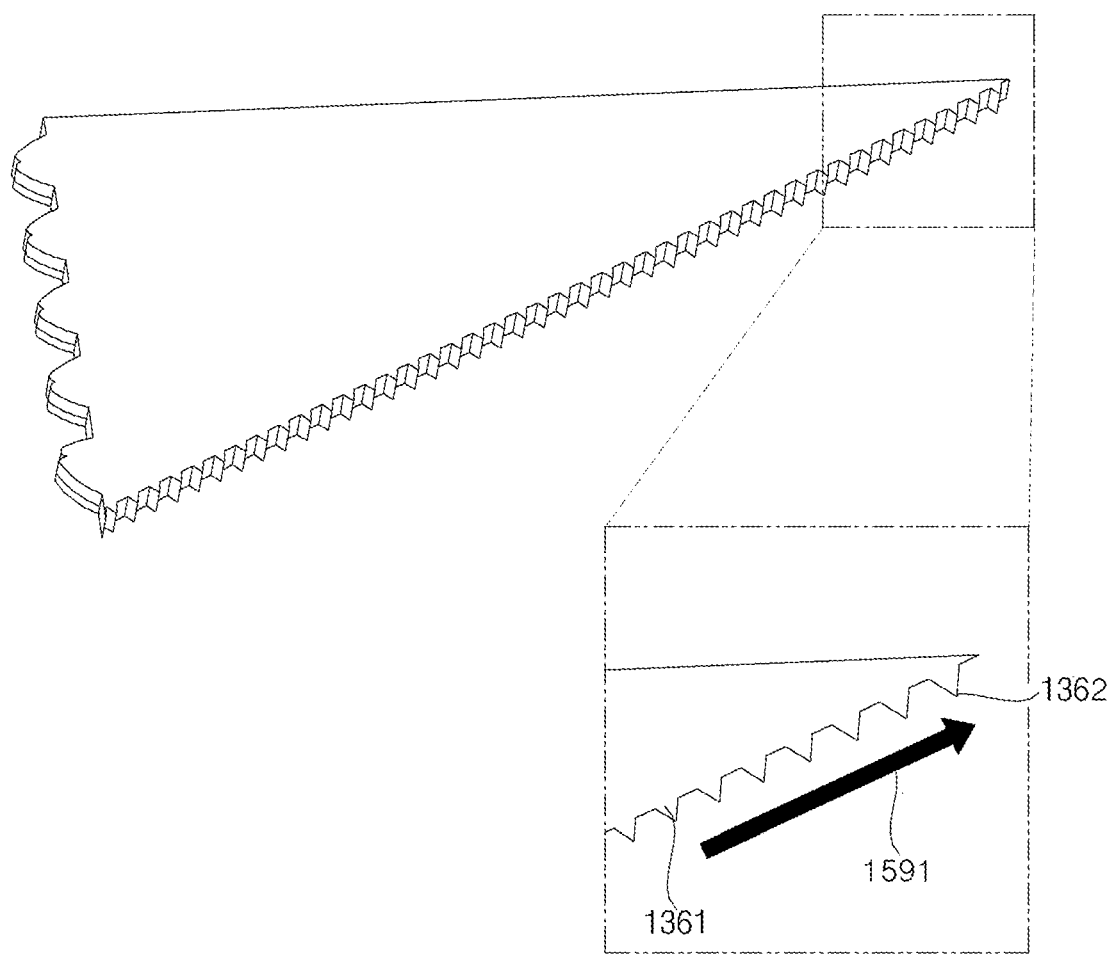

As illustrated in FIG. 15, the optic pattern unit 1300 may include a plurality of optic patterns.

A plurality of protruding portions included in at least one of the plurality of optic patterns may increase in size as a distance from the light output unit 160 increases.

For example, an optic pattern may include a first protruding portion 1361 and a second protruding portion 1362.

The second protruding portion 1362 may be disposed farther from the light output unit 160 than the first protruding portion 1361 is. In this case, the second protruding portion 1362 may be greater in size than the first protruding portion 1361.

Figure 16:
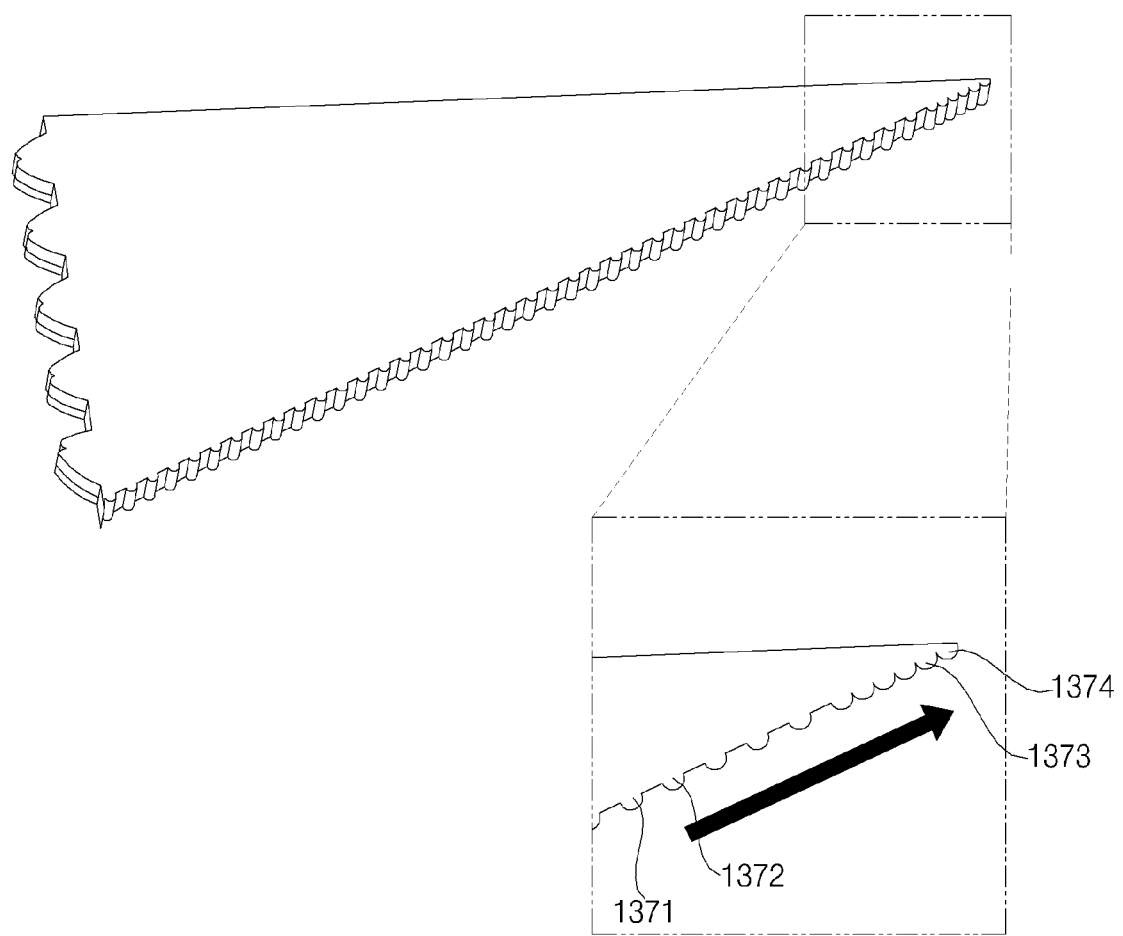

As illustrated in FIG. 16, the optic pattern unit 1300 may include a plurality of optic patterns.

An interval between a plurality of protruding portions included at least one of the plurality of optic patterns may decrease as a distance from the light output unit 160 increases.

For example, an optic pattern may include first to fourth protruding portions 1371, 1372, 1373, and 1374.

The first to fourth protruding portions 1371, 1372, 1373, and 1374 may be placed closer to the light output unit 160 in the order named.

The first protruding portion 1371 may be positioned next to the second protruding portion 1372, and the third protruding portion 1373 may be positioned next to the fourth protruding portion 1374.

An interval between the third protruding portion 1373 and the fourth protruding portion 1374 may be smaller than an interval between the first protruding portion 1371 and the second protruding portion 1372.

Due to this structure of the optic pattern, each of the plurality of light generation groups may emit light to be incident on the cover lens 999, while minimizing a light loss.

FIG. 17 is a diagram illustrating an example optical path changing unit of an example light guide.

Referring to FIG. 17, the optical path changing unit 1200 may include a plurality of lenses (see the reference numerals 1210, 1220, 1230, 1240, and 1250 in FIG. 12).

The plurality of lenses 1210, 1220, 1230, 1240, and 1250 may guide lights generated by the plurality of light generation groups (see the reference numerals 1110, 1120, 1130, 1140, and 1150 in FIG. 12) to be incident on the plurality of optic patterns 1310, 1320, 1330, 1340, and 1350.

The plurality of lenses 1210, 1220, 1230, 1240, and 1250 may have the same shape.

A direction, which at least one of the plurality of lenses 1210, 1220, 1230, 1240, or 1250 faces, may different from a direction which the rest of the plurality of lenses 1210, 1220, 1230, 1240, and 1250 face.

At least one of the plurality of lenses may have a shape having one surface flat and the other surface convex, as indicated by reference numeral 1200a or 1220b.

At least one of the plurality of lenses may be a collimator, as indicated by reference numeral 1220c.

Figure 18:
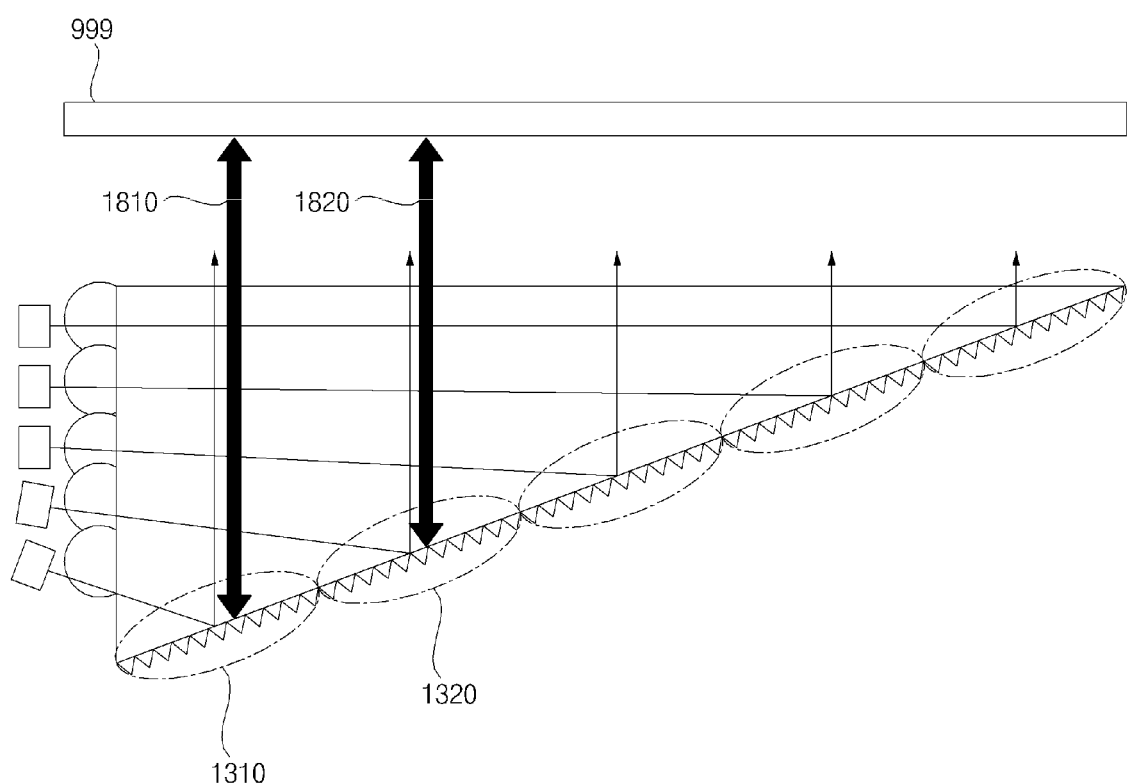
FIG. 18 is a diagram illustrating an example relationship between a plurality of optic patterns.

FIG. 18 is a diagram illustrating an example relationship between a plurality of optic patterns.

Referring to FIG. 18, the optic pattern unit 1300 may include a first optic pattern 1310 and a second optic pattern 1320.

The second optic pattern 1320 may be disposed away from the light output unit 160 at a distance greater than a distance between the light output unit 160 and the first optic pattern 1310.

The first optic pattern 1310 may be placed at a location where the shortest distance to the light output unit 160 is a first distance.

The second optic pattern 1320 may be placed at a location where the shortest distance to the light output unit 160 is a second distance.

In this case, the second distance may be greater than the first distance.

The first optic pattern 1310 may be disposed farther than the cover lens 999 than the second optic pattern 1320 is.

The first optic pattern 1310 may be placed at a location from which the shortest distance to the cover lens 999 is a third distance.

The second optic pattern 1320 may be placed at a location from which the shortest distance to the cover lens 999 is a fourth distance.

In this case, the third distance may be greater than the fourth distance.

Figure 19:
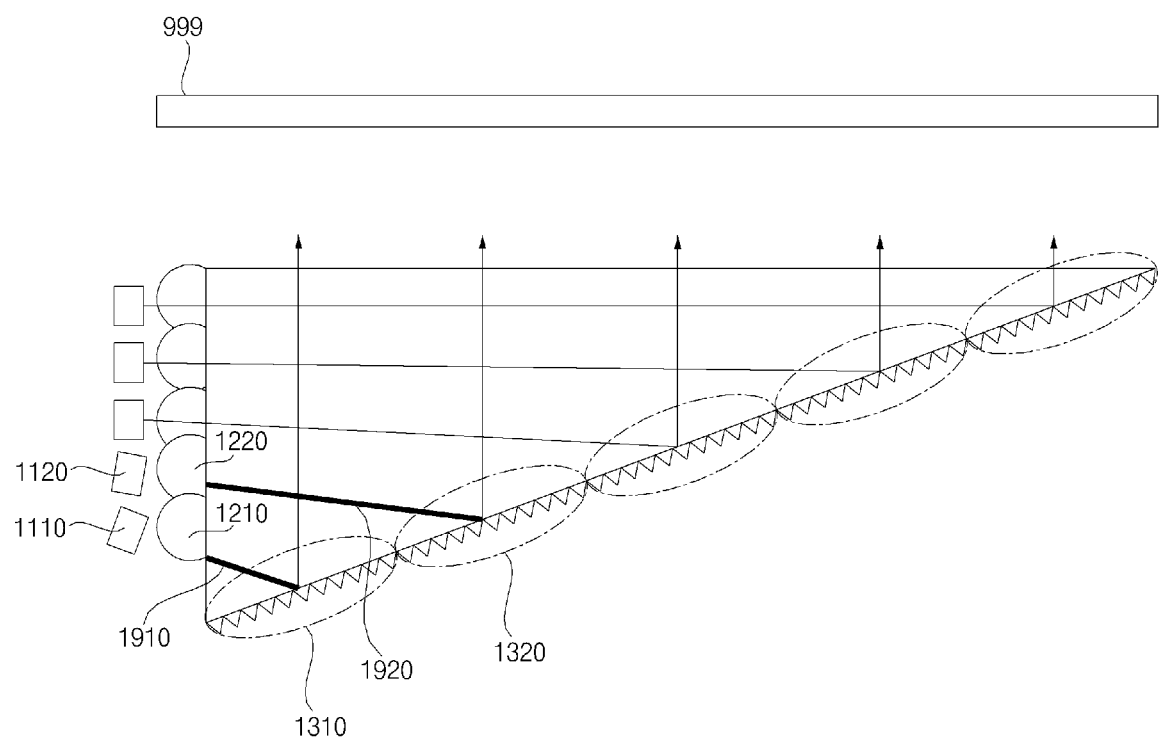
FIG. 19 is a diagram for explaining an example of a plurality of optical paths.

FIG. 19 is a diagram for explaining an example plurality of optical paths.

Referring to FIG. 19, the light output unit 160 may include a first light generation group 1110 and a second light generation group 1120.

The second light generation group 1120 may be placed closer to the cover lens 999 than the first light generation group 1110 is.

The first light generation group 1110 may be placed at a location from which the shortest distance to the cover lens 999 is a first distance.

The second light generation group 1120 may be placed at a location from which the shortest distance to the cover lens 999 is a second distance.

In this case, the second distance may be smaller than the first distance.

The optical path changing unit 1200 may include a first collimator 1210 and a second collimator 1220.

On the first collimator 1210, light generated by the first light generation group 1110 may be incident.

The first collimator 1210 may emit the incident light to the first optic pattern 1310.

On the second collimator 1220, light generated by the second light generation group 1120 may be incident.

The first collimator 1220 may emit the incident light to the second optic pattern 1320.

An optical path 1910 from the first collimator 1210 to the optic pattern unit 1300 may be shorter than an optical path 1920 from the second collimator 1220 to the optic pattern unit 1300.

Figure 20:
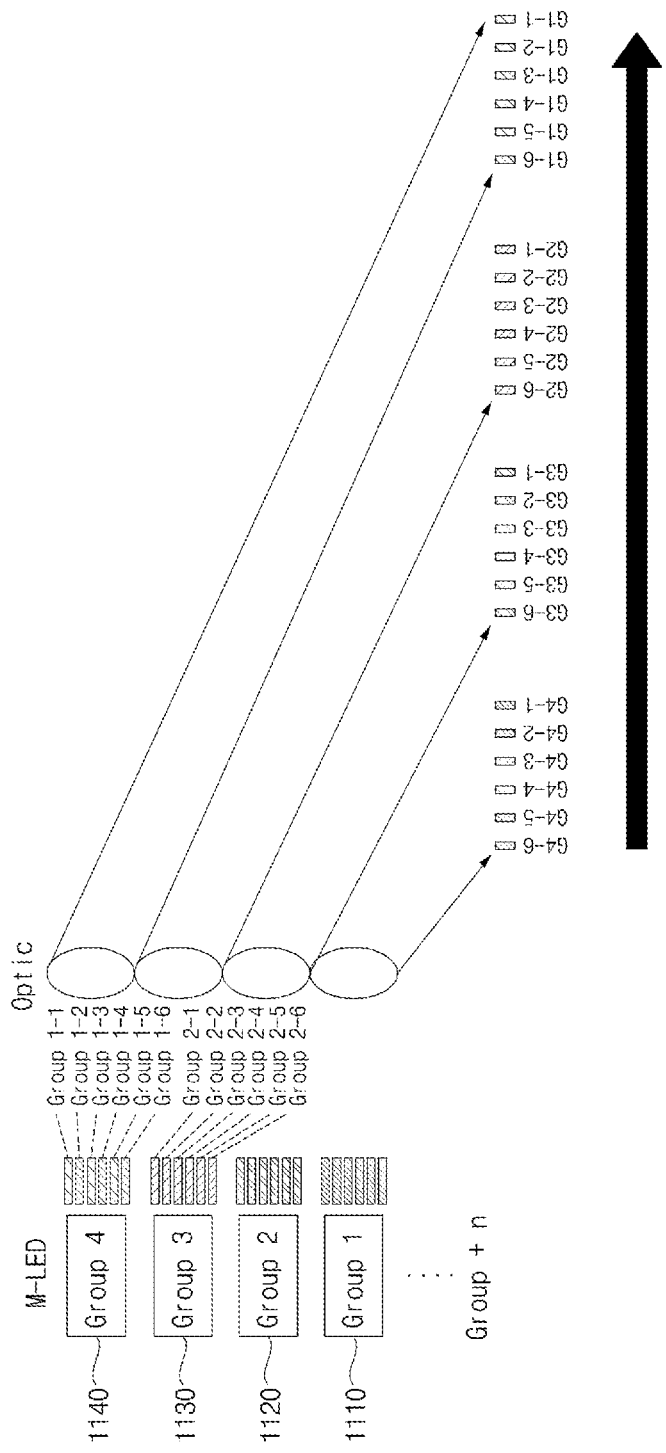
FIGS. 20 and 21 are diagrams for explaining examples of a light output pattern.
Figure 21:
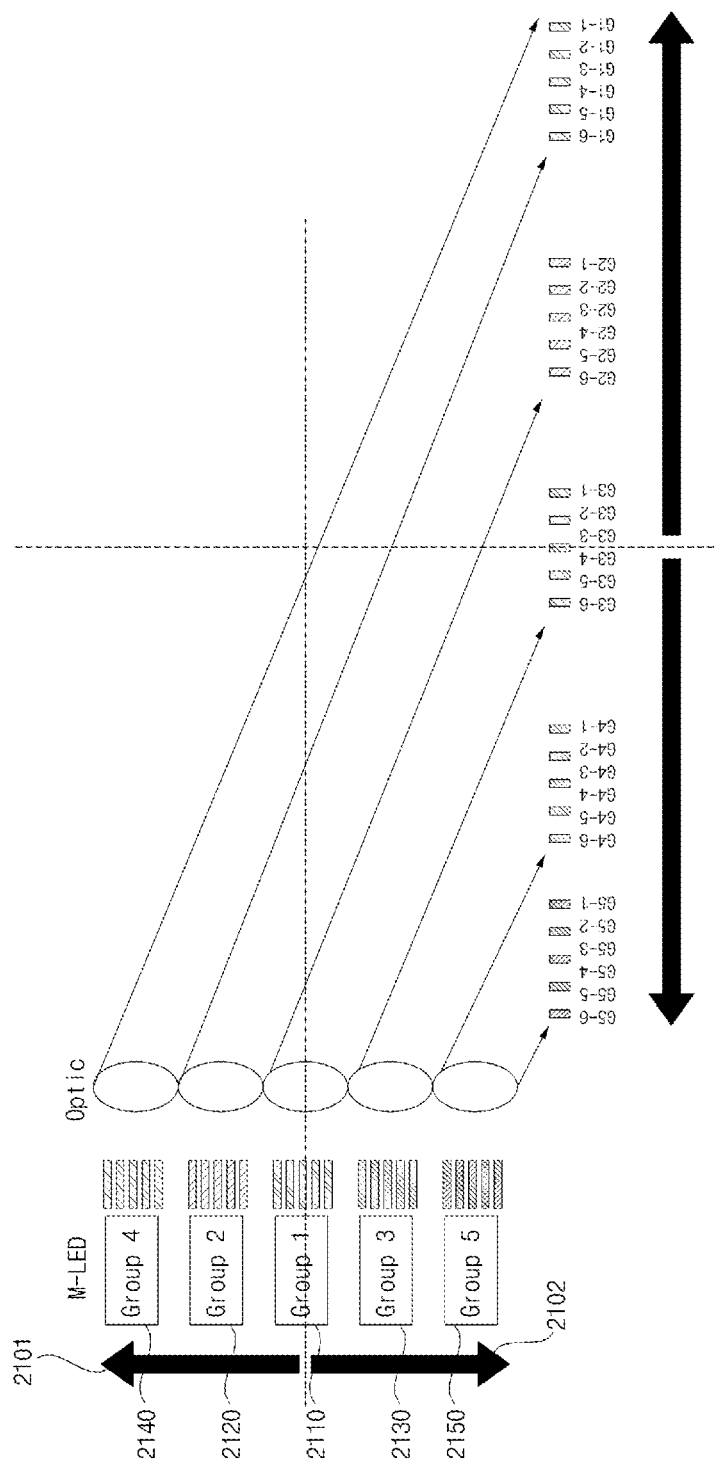

FIGS. 20 and 21 are diagrams for explaining examples of a light output pattern.

The light output unit 160 may function as a turn-signal lamp.

The processor 170 may control the light output unit 160 to perform sequential lighting operation.

Referring to FIG. 20, the processor 170 may control the light output unit 160.

The processor 170 may control the plurality of light generation groups 1110, 1120, 1130, and 1140 to be turned on based on a first sequence within a first period.

For example, while at least one of the plurality of light generation groups included in the light output unit 160 is turned on, the processor 170 may control the rest of the plurality of light generation groups to be turned on sequentially.

For example, while the plurality of light generation groups 1110, 1120, 1130, and 1140 is all turned on, the processor 170 may control the plurality of light generation groups 1110, 1120, 1130, and 1140 to be turned off all at once.

In some implementations, the first period may be defined as a time period from a first time when the plurality of light generation groups 1110, 1120, 1130, and 1140 is all turned off to a second time when the plurality of light generation groups 1110, 1120, 1130, and 1140 is all turned off again.

In some implementations, the first period may be defined as a time period from a first time when the plurality of light generation groups 1110, 1120, 1130, and 1140 is all turned on and to a second time when the plurality of light generation groups 1110, 1120, 1130, and 1140 is all turned on again.

Referring to FIG. 21, the processor 170 may control the light output unit 160.

The light output unit 160 may include a plurality of light generation groups 2110, 2120, 2130, 2140, and 2150.

Each of the light generation groups 2110, 2120, 2130, 2140, and 2150 may be composed of an array module 200m having a plurality of micro LEDs.

The processor 170 may control the plurality of micro LEDs included in each of the plurality of light generation groups 2110, 2120, 2130, 2140, and 2150 to be sequentially turned on within a first period.

In some implementations, the light output unit 160 may include a first light generation group 2110 and a second light generation group 2120.

The second light generation group 2120 may be disposed neighboring to the first light generation group 2110.

While a plurality of micro LEDs in the first light generation group 2110 is all turned on, the processor 170 may control a plurality of micro LEDs in the second light generation group 2120 to be turned on sequentially.

In some implementations, the first light generation group 2110 may be positioned at the center of the plurality of light generation groups 2110, 2120, 2130, 2140, and 2150.

The processor 170 may control the plurality of micro LEDs in the first light generation group to be turned on sequentially in order in which a micro LED at the center among the plurality of micro LEDs is turned on first and then the rest of the plurality of micro LEDs are turned on sequentially in a first direction 2101 and a direction 2102 opposite to the first direction.

The first direction may be defined as a direction which a straight line faces within a 3D space.

For example, the first direction may be defined as the overall length direction or as a direction that horizontally forms an angle of between 0 degree and 30 degrees relative to the overall length direction.

For example, the first direction may be defined as the heading direction of a vehicle or as a direction that horizontally forms an angle of between 0 degree and 30 degrees relative to the heading direction.

For example, the first direction may be defined as the straight-forward direction of travel of a vehicle or as a direction that horizontally forms an angle of between 0 degree and 30 degrees relative to the straight-forward direction of travel.

For example, the first direction may be defined as the rearward direction of travel of a vehicle or as a direction that horizontally forms an angle of between 0 degree and 30 degrees relative to the rearward direction of travel.

In some implementations, the light output unit 160 may further include a second light generation group 2120 and a third light generation group 2130.

The second light generation group 2120 may be disposed neighboring to the first light generation group 2110 in the first direction 2101.

The third light generation group 2130 may be disposed neighboring to the first light generation group 2110 in the direction 2102 opposite to the first direction.

While the plurality of micro LEDs in the first light generation group 2110 is all turned on, the processor 170 may control a plurality of micro LEDs in the second light generation group 2120 to be turned on sequentially.

While the plurality of micro LEDs in the first light generation group 2110 is all turned on, the processor 170 may control a plurality of micro LEDs in the third light generation group 2130 to be turned on sequentially.

In this case, a sequential turn-on operation of the second light generation group, and a sequential turn-on operation of the third light generation group 2130 may be performed at the same time.

That is, the processor 170 may perform a sequential turn-on operation of the second light generation group 2120 and a sequential turn-on operation of the third light generation group 2130 at the same time.

The present disclosure as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A lamp for a vehicle, comprising:
   a cover lens;
   a housing that is coupled to the cover lens and that defines a lamp space with the cover lens;
   a light output unit comprising a plurality of light generation groups that are arranged inside of the lamp space in a first direction, each of the plurality of light generation groups comprising an array module that is flexible and that comprises a plurality of micro Light Emitting Diodes (LEDs); and
   a light guide that has a three-dimensional (3D) shape and that is configured to guide light from the light output unit in a light output direction,
   wherein the light guide comprises:
      a first surface that defines a portion of the 3D shape of the light guide, that faces the light output unit, and that extends in the first direction in which the plurality of light generation groups are arranged in the lamp space,
      a second surface that defines a portion of the 3D shape of the light guide and that defines an acute angle with respect to the first surface,
      an optical pattern unit that is located at the second surface and that defines a plurality of optical patterns at portions of the light guide, respectively, and
      an optical path changing unit that is located on the first surface and that is configured to change optical paths of light generated by the plurality of light generation groups to the plurality of optical patterns, respectively, and
   wherein at least one of the plurality of light generation groups is oriented to a direction that is different from one or more directions in which other of the plurality of light generation groups are oriented.

2. The lamp according to claim 1, wherein a number of the plurality of optical patterns corresponds to a number of the plurality of light generation groups.

3. The lamp according to claim 1, wherein each of the plurality of optical patterns comprises a plurality of protruding portions, and
wherein sizes of the plurality of protruding portions increase based on an increase of a distance between the light output unit and each of the plurality of protruding portions.

4. The lamp according to claim 1, wherein each of the plurality of optical patterns comprises a plurality of protruding portions, and
wherein intervals between adjacent protruding portions of the plurality of protruding portions decrease based on an increase of a distance between the light output unit and each of the plurality of protruding portions.

5. The lamp according to claim 1, wherein the plurality of optical patterns of the optical pattern unit comprise:
a first optical pattern spaced apart from the light output unit by a first distance; and
a second optical pattern spaced apart from the light output unit by a second distance greater than the first distance, and
wherein a distance between the first optical pattern and the cover lens is greater than a distance between the second optical pattern and the cover lens.

6. The lamp according to claim 1, wherein the optical path changing unit comprises a plurality of collimators, and
wherein a number of the plurality of collimators corresponds to a number of the plurality of light generation groups.

7. The lamp according to claim 6, wherein the light output unit comprises:
a first light generation group spaced apart from the cover lens by a first distance; and
a second light generation group spaced apart from the cover lens by a second distance less than the first distance,
wherein the plurality of collimators comprises:
a first collimator configured to receive light generated by the first light generation group, and
a second collimator configured to receive light generated by the second light generation group, and
wherein an optical path from the first collimator to the optical pattern unit is shorter than an optical path from the second collimator to the optical pattern unit.

8. The lamp according to claim 1, wherein the light guide further comprises a third surface that defines a portion of the 3D shape of the light guide and that defines an acute angle with respect to the second surface.

9. The lamp according to claim 8, wherein the third surface defines a right angle or an obtuse angle with respect to the first surface.

10. The lamp according to claim 1, further comprising at least one processor configured to control the light output unit,
wherein the processor is configured to control a sequence and a period of activation of one or more of the plurality of light generation groups.

11. The lamp according to claim 10, wherein the processor is further configured to, in a state in which at least one of the plurality of light generation groups is turned on, turn on a rest of the plurality of light generation groups sequentially.

12. The lamp according to claim 11, wherein the processor is further configured to, in a state in which all of the plurality of light generation groups are turned on, turn off all of the plurality of light generation groups simultaneously.

13. The lamp according to claim 1, further comprising at least one processor configured to control the light output unit,
wherein the processor is configured to:
control each of the plurality of micro LEDs included in each of the plurality of light generation groups, and
turn on the plurality of micro LEDs sequentially in a predetermined period.

14. The lamp according to claim 13, wherein the light output unit comprises:
a first light generation group comprising a first portion of the plurality of micro LEDs; and
a second light generation group disposed adjacent to the first light generation group, the second light generation group comprising a second portion of the plurality of micro LEDs, and
wherein the processor is further configured to, in a state in which all of the first portion of the plurality of micro LEDs are turned on, turn on the second portion of the plurality of micro LEDs sequentially.

15. The lamp according to claim 13, wherein the light output unit comprises a first light generation group located at a center position of the plurality of light generation groups, the first light generation group comprising a first portion of the plurality of micro LEDs,
wherein a second portion of the plurality of micro LEDs are arranged both in a first side of the center position and in a second side of the center position opposite to the first side,
wherein the processor is further configured to:
turn on the first portion of the plurality of micro LEDs included in the first light generation group, and
after turning on the first portion of the plurality of micro LEDs, turn on the second portion of the plurality of micro LEDs sequentially in directions from the center position to the first side and to the second side.

16. The lamp according to claim 15, wherein the light output unit further comprises:
a second light generation group disposed adjacent to the first light generation group in the first side, the second light generation group comprising a second portion of the plurality of micro LEDs; and
a third light generation group disposed adjacent to the first light generation group in the second side, the third light generation group comprising a third portion of the plurality of micro LEDs, and
wherein the processor is further configured to, in a state in which all of the first portion of the plurality of micro LEDs are turned on:
turn on the second portion of the plurality of micro LEDs included in the second light generation group sequentially, and
turn on the third portion of the plurality of micro LEDs included in the third light generation group sequentially.

17. The lamp according to claim 1, wherein the light output unit is configured to indicate a turn-signal of the vehicle.

18. The lamp according to claim 1, wherein the optical path changing unit is attached to the first surface of the light guide.

19. The lamp according to claim 1, wherein the optical path changing unit comprises a plurality of protrusions that protrudes from the first surface of the light guide to the plurality of light generation groups, respectively.

20. The lamp according to claim 1, wherein the array module comprises a flexible copper clad laminated (FCCL) substrate.

21. The lamp according to claim 1, wherein a distance between the at least one of the plurality of light generation groups and the second surface of the light guide is less than a distance between any other of the plurality of light generation groups and the second surface of the light guide.

\* \* \* \* \*